US012708843B2

(12) United States Patent
Dasher et al.

(10) Patent No.: US 12,708,843 B2
(45) Date of Patent: Aug. 18, 2026

(54) DYNAMIC PERSONAL EXTENDED REALITY SAFE AREA CONTROL

(71) Applicant: Adeia Guides Inc., San Jose, CA (US)

(72) Inventors: Charles Dasher, Lawrenceville, GA (US); Christopher Phillips, Hartwell, GA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 356 days.

(21) Appl. No.: 18/227,732

(22) Filed: Jul. 28, 2023

(65) Prior Publication Data

US 2025/0032905 A1 Jan. 30, 2025

(51) Int. Cl.
*A63F 13/00* (2014.01)
*A63F 13/217* (2014.01)
*A63F 13/25* (2014.01)

(52) U.S. Cl.
CPC ............ *A63F 13/25* (2014.09); *A63F 13/217* (2014.09); *A63F 2300/8082* (2013.01)

(58) Field of Classification Search
None
See application file for complete search history.

(56) References Cited

U.S. PATENT DOCUMENTS 5,659,691 A * 8/1997 Durward .................. G09B 9/00 709/204
5,900,849 A 5/1999 Gallery
8,659,658 B2 * 2/2014 Vassigh ................... G06F 3/017 348/143
9,141,194 B1 * 9/2015 Keyes ..................... G06F 3/014
9,219,901 B2 * 12/2015 Mulholland ............. H04N 9/87
10,423,241 B1 * 9/2019 Pham ................... G02B 27/017
10,691,290 B2 * 6/2020 Zhou ........................ G06F 9/451
11,017,611 B1 * 5/2021 Mount ................... G06V 20/20
11,073,902 B1 * 7/2021 Rahimi ................... G06F 3/011
11,517,821 B2 * 12/2022 Lee ....................... A63F 13/212
12,056,270 B1 8/2024 Phillips
2009/0066690 A1 * 3/2009 Harrison ............... G06T 19/006 345/419

(Continued)

FOREIGN PATENT DOCUMENTS

CN 114694172 A 7/2022
WO 2017218972 A1 12/2017

OTHER PUBLICATIONS

Analytic Geometry, Wikipedia, printed on Aug. 11, 2023.

(Continued)

*Primary Examiner* — Paul A D'Agostino
(74) *Attorney, Agent, or Firm* — HG LAW LLP

(57) ABSTRACT

A personal safe area is determined for extended reality (XR) devices, such as head mounted devices in virtual reality (VR) sessions, sharing a common larger play area. The personal safe areas may be sized based on user size, may have radii centered on the XR device and parallel to a floor, and may move with the XR device as the XR device moves in an immersive reality session. A notification indicating proximity to another XR device may be generated, and the notification may indicate the direction from which the other XR device is approaching. Also contemplated is real time adjusting an XR gameplay, game display or game flow of one or more XR devices to avoid overlap of safe spaces by shifting virtual game objects in a safer direction.

16 Claims, 21 Drawing Sheets

(56) References Cited

U.S. PATENT DOCUMENTS

2012/0142415 A1* 6/2012 Lindsay ........ G06T 19/006 463/33
2013/0328928 A1 12/2013 Yamagishi et al.
2013/0336629 A1* 12/2013 Mulholland ........ H04N 9/87 386/230
2016/0049013 A1* 2/2016 Tosas Bautista ........ G06F 3/012 345/633
2016/0300395 A1* 10/2016 Bretschneider ........ G06T 19/006
2016/0350973 A1* 12/2016 Shapira ........ G06F 3/011
2017/0244811 A1* 8/2017 McKenzie ........ G02B 27/017
2017/0277253 A1* 9/2017 Mullen ........ A63F 13/843
2018/0033177 A1* 2/2018 Han ........ A63F 13/211
2018/0093184 A1 4/2018 Stafford
2018/0190027 A1 7/2018 Yao et al.
2018/0274936 A1* 9/2018 Choi ........ H04N 7/185
2018/0276969 A1* 9/2018 Obaidi ........ G06V 20/20
2018/0356880 A1* 12/2018 Kashihara ........ G06F 3/0346
2019/0068529 A1* 2/2019 Mullins ........ G06F 40/58
2019/0094981 A1* 3/2019 Bradski ........ G06V 40/168
2019/0164343 A1* 5/2019 Bailey ........ A63F 13/25
2019/0171346 A1* 6/2019 Zhou ........ G06F 9/451
2019/0212812 A1 7/2019 Sawyer et al.
2019/0335290 A1* 10/2019 Laaksonen ........ G02B 27/017
2020/0001461 A1* 1/2020 Cappello ........ B25J 9/0003
2020/0099891 A1* 3/2020 Valli ........ H04L 65/403
2020/0103521 A1 4/2020 Chiarella et al.
2020/0139240 A1* 5/2020 Hrincar ........ G06T 13/40
2020/0143596 A1* 5/2020 Lee ........ G06F 3/04883
2020/0238177 A1 7/2020 Black et al.
2020/0289921 A1* 9/2020 Chida ........ G02B 27/00
2021/0088688 A1* 3/2021 Chapman ........ G05B 13/048
2021/0162305 A1* 6/2021 Ito ........ A63F 13/65
2021/0173471 A1* 6/2021 Johnson ........ G06F 3/011
2021/0283503 A1* 9/2021 Challinor ........ A63F 13/211
2021/0319220 A1* 10/2021 Ichim ........ G06F 3/017
2021/0349309 A1* 11/2021 Kawano ........ G06F 3/011
2022/0026519 A1* 1/2022 Wu ........ G01S 7/006
2022/0219076 A1* 7/2022 Chida ........ A63F 13/25
2022/0262504 A1 8/2022 Bratty et al.
2022/0277525 A1* 9/2022 Li ........ G06V 20/635
2022/0308654 A1* 9/2022 Chen ........ G06F 3/011
2023/0097571 A1 3/2023 Mccain et al.
2023/0196681 A1* 6/2023 Madden ........ G06T 7/70 345/419
2023/0196692 A1* 6/2023 Madden ........ G06T 19/006 345/419
2023/0282089 A1* 9/2023 Chen ........ H04W 4/90 340/573.1
2026/0016886 A1 1/2026 Phillips

OTHER PUBLICATIONS

Dividing A Polygon In Any Given No. Of Equal Areas, Sumit Khetarpal, Dec. 14, 2014.

Fair Partitions of Polygons—an introduction, R. Nandakumar1 , N. Ramana Rao, Nov. 21, 2010.

Fusion of the SLAM with Wi-Fi Based Positioning Methods for Mobile Robot-Based Learning Data Collection, Localization and Tracking in Indoor Spaces, Lee et al., Sep. 11, 2020, https://www.ncbi.nlm.nih.gov/pmc/articles/PMC7570627/.

https://gfycat.com/bittersourkingbird printed on Aug. 28, 2023.

https://www.youtube.com/watch?v=bQ3ySIfc1Gk printed on Aug. 28, 2023.

Map physical spaces with HoloLens, Oct. 13, 2022, Dorrene Brown and Seth Paniagua.

More on cutting a polygon into triangles of equal areas, Yatao Du, Ren Ding, Journal of Applied Mathematics and Computing, Mar. 2005.

The next version of Oculus Quest's system software will enable people to set up VR play spaces stretching up to 15 meters in either direction, https://uploadvr.com/oculus-quest-guardian-size-increasing/ Ian Hamilton, Jun. 9, 2021.

Wifi Positioning Sytem https://en.wikipedia.org/wiki/Wi-Fi_positioning_system Printed on Aug. 11, 2023.

* cited by examiner

A size of each safe area 105a, 105b is determined according the size of the XR player.
111a
2.4 feet
115a
112b
112a
111b
3.2 feet
115b
112d
112c
101
Safe Area
Player 1
105a
103
Player 2
105b
Each safe area 105a, 105b moves with the XR device as the player moves through the play space.

Figure 12:
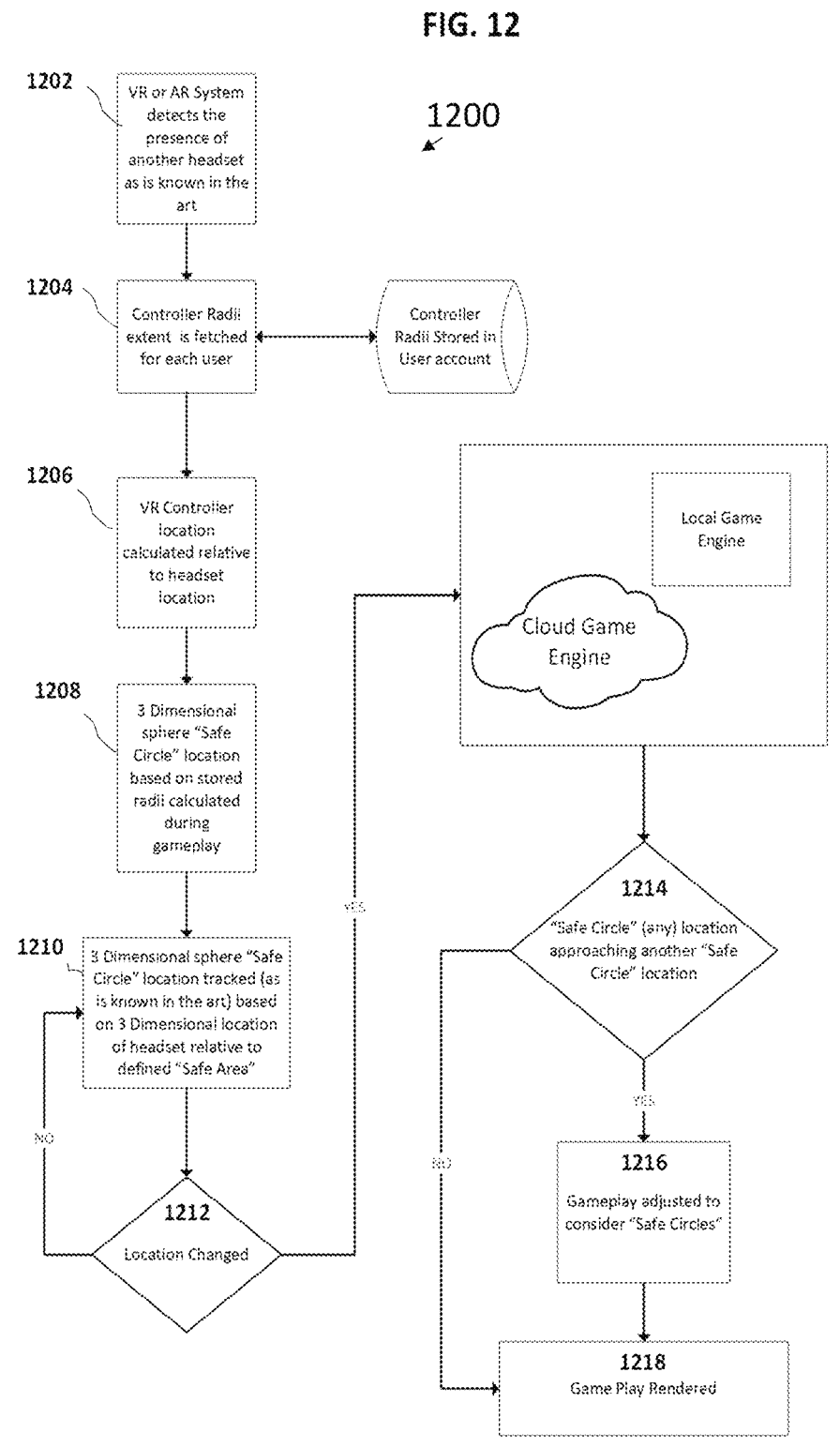

1202 VR or AR System detects the presence of another headset as is known in the art 1204 Controller Radii extent is fetched for each user Controller Radii Stored in User account 1206 VR Controller location calculated relative to headset location 1208 3 Dimensional sphere "Safe Circle" location based on stored radii calculated during gameplay 1210 3 Dimensional sphere "Safe Circle" location tracked (as is known in the art) based on 3 Dimensional location of headset relative to defined "Safe Area"

1212 Location Changed

NO

YES

Local Game Engine

Cloud Game Engine

1214 "Safe Circle" (any) location approaching another "Safe Circle" location

YES

NO

1216 Gameplay adjusted to consider "Safe Circles"

1218 Game Play Rendered

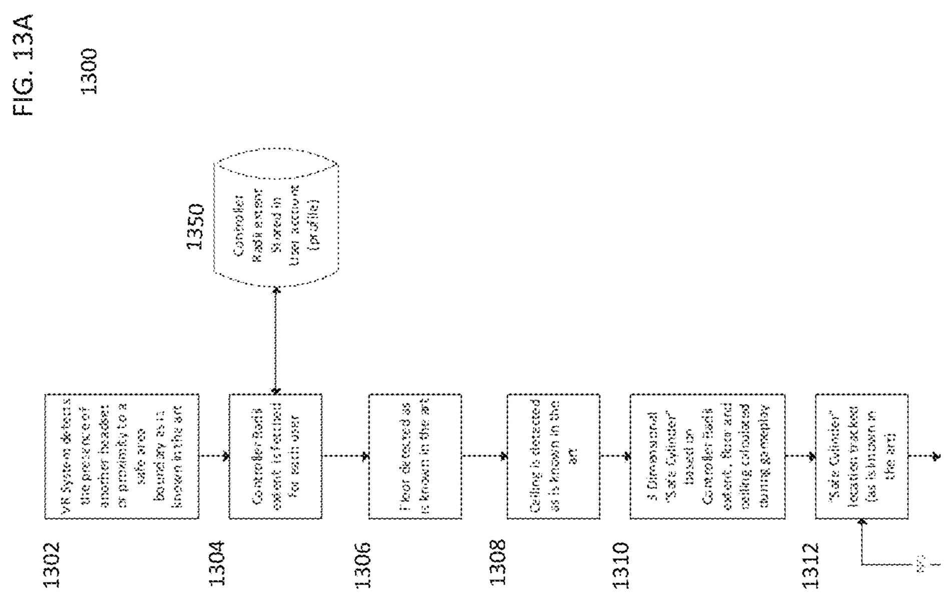
FIG. 13A
1300
1302
VR System detects the presence of another headset or proximity to a safe area boundary as is known in the art
1304
Controller Radii extent is fetched for each user
1350
Controller Radii extent Stored in User account (profile)
1306
Floor detected as is known in the art
1308
Ceiling is detected as is known in the art
1310
3 Dimensional "Safe Cylinder" based on Controller Radii extent, floor and ceiling calculated during gameplay
1312
"Safe Cylinder" location tracked (as is known in the art)

1314
Location Changed
1316
1318
Cloud Safety Manager
1320
1322
Game play continues
1324
1326
1328
1350
Cloud Game Engine
1352

Game level when sufficient gamplay area exists

Gameplay when insufficent gameplay area exists

1501
Fruit
Fruit presented to player on left side of play area
Fruit
Fruit

Monster positions are biased away from player 1 "Safe Circle"
1503

FIG. 17A
1501
1701
1503
FIG. 17B
1701
1503

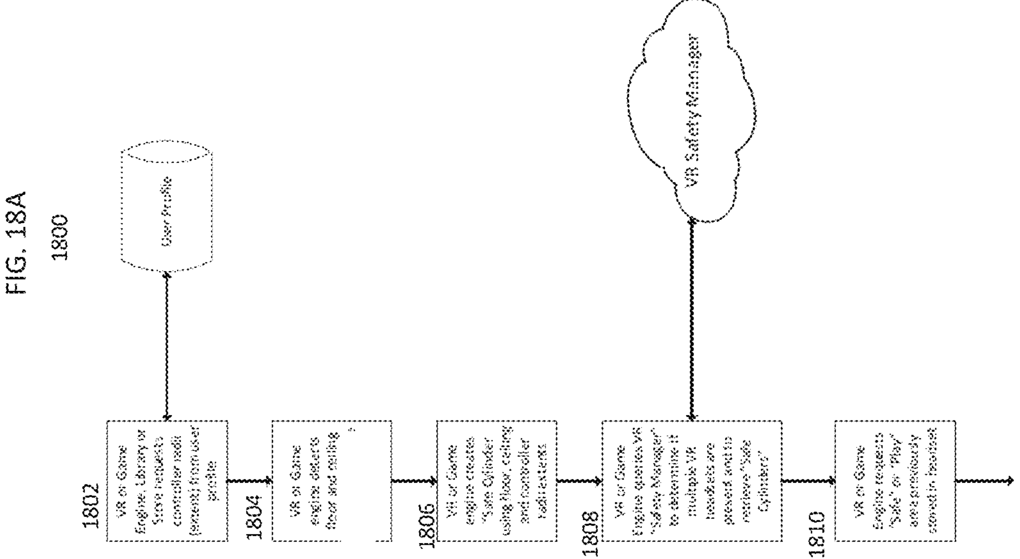
FIG. 18A
1800
1802
VR or Game Engine, Library or Store requests controller radii (extent) from user profile
User Profile
1804
VR or Game engine detects floor and ceiling
1806
VR or Game engine creates "Safe Cylinder using floor, ceiling and controller radii extents
1808
VR or Game Engine queries VR "Safety Manager" to determine if multiple VR headsets are present and to retrieve "Safe Cylinders"
VR Safety Manager
1810
VR or Game Engine requests "Safe" or "Play" area previously stored in headset

DYNAMIC PERSONAL EXTENDED REALITY SAFE AREA CONTROL

BACKGROUND

The present disclosure relates to managing safe play areas for extended reality (XR) devices, for example, and, in particular, to generation of a dynamic personal safe area for an immersive device session in a physical space.

SUMMARY

A technological problem that arises from the use of XR applications is that when two or more XR devices shares a physical space accidental collision of users using the XR device, such as a head mounted displays (HMDs), needs to be avoided. For example, during a VR session, users are completely immersed in the virtual world simulated by the VR equipment and have the physical sensation of being present in the virtual world. As a result, a VR device user may have little or no awareness of the physical environment outside of the user's VR headset and may jump into windows or bump into people or other objects in the physical space in which the VR session takes place. As XR use proliferates, increasingly XR devices have been used for immersive sessions in homes, including in smaller living spaces, where the available space is shared by more than one XR device in virtual reality sessions.

In one approach, an XR device user may delineate a safe play area within a physical space, with virtual boundaries ("guardians") visible via the XR device, by indicating virtual boundaries having fixed or relatively fixed locations in the physical space. Such virtual boundaries may be demarcated manually using local equipment at the XR device. According to this approach, when, two or more users share a room for XR activity, during a calibration period each user may utilize a controller to "draw" virtual boundaries of a safe area different from the safe area of a second user. The defining of such mutually non-overlapping safe areas may be done without coordinating with the other users, resulting in a static and fixed boundary area for each user after the calibration period. When an XR device user steps outside of a safe area boundary designated for the VR session, a "passthrough" mode may be activated, which enables the user to see the physical area through the XR headset. As a result, the XR user suddenly gains awareness of his/her position and orientation in physical space, thus preventing running into a chair or bumping into other people outside the safe area.

This approach may prevent accidental collision but interrupts the VR experience. Further, such an approach fails to maximize the amount of physical space available to each user because much of the time during an XR session most of the space available may not be in play by either XR device user, yet each user may use at most the portion of the physical space allocated to that user's XR device. Also, in some instances, nothing prevents these two users from incorrectly defining their own safe areas such that the user-drawn safe areas overlap, resulting in a dangerous situation. For example, while the users may verbally communicate to each other their virtual boundaries, nothing may prevent one user from defining his boundary in a way that conflicts with a verbally agreed upon boundary. Further, in a typical example, one user's XR device may not generate a notification that another user's XR device has an overlapping safe area. Indeed, the XR device may not be notified that any such conflict exists. In this way, the users may stay completely within their designated safe areas while engaged in XR sessions, remaining fully immersed in their virtual environments, and yet may nevertheless collide. Such an approach may induce a feeling of false safety since each user remains in his/her self-defined safe area. Such collisions may be especially dangerous if the users are playing active games (e.g., VR tennis) involving quick and forceful movements.

In one approach, the two users may manually define their safe areas in a very deliberate, coordinated manner in an effort to prevent overlap of safe areas. This coordinated effort to draw non-overlapping boundaries may be tedious and prone to error. Also, even if the users can reach agreement on allocation of physical space, and even if they succeed in defining non-overlapping safe areas, the virtual boundaries typically remain fixed and static. Thus, if one user needs less space, for example, because the user is smaller in stature and arm length, or because the user switches to an XR application that typically calls for less movement, or because one of the XR users terminates the XR session and leaves, these manually defined borders fail to account for that. If a first XR user wishes to leave, then the first XR user may interrupt the XR session of the second XR user, advise him/her that second XR user may now take advantage of the full physical space, in which case the second XR user must again go through the tedious process of redefining his safe area. Further, if one user later wants to engage in XR session while no other XR user is present in the play space, the user must again go through the manual process of redefining a safe area to take advantage of the full physical space. In a related vein, if an XR session is in progress, and a second XR user initiates an XR session in the physical space, the second XR user must interrupt the XR session of the first XR user and negotiate for use of part of the physical space, and then each user must define a respective safe area yet again. In other words, this manual approach may not account for the dynamic real-time needs of the two or more VR users, resulting in inefficient allocation of physical space into safe areas, and possible injury and damage if safe areas are not properly defined according to the actual current XR use.

In one approach, when two VR devices are part of the same ecosystem or service, a first XR device may detect that a second XR device is in physical proximity to it. In response, one or both users may be forced to redefine their play areas such that they do not overlap. However, because safe areas typically persist across sessions, if one of the users later wants to take advantage of the full physical space, he or she will need to go through the tedious process of manually redefining his/her safe space.

In an embodiment according to an aspect of the present disclosure, the system may allocate a dynamic, personal safe area to an XR device according to a size of the user of the XR device. For example, the XR user may be holding a handheld device, such as a laser pointer or XR/VR controller, and the system may identify a distance between the HMD and the laser pointer or XR/VR controller to determine an arm length of the user. A circle, centered at the HMD, with a radius of this identified distance may be determined as a minimal size of the personal safe area of the XR device for the XR session. According to an embodiment, such a personal safe area of the XR device for the XR session may be dynamic because as the XR device moves with the user through the physical space, the system may continuously move the personal safe area around it and may warn of other users XR devices or of other obstacles or of larger play space boundaries that come too close. The automatic movement of the personal safe area may be performed in real time in response to detection of movement of the user wearing the XR device. The system may store the dimensions of the safe area for each XR user from session to session.

Two or more XR devices may each have their own personal, dynamic safe areas determined according to the size of their respective users. Also, in an embodiment, a larger play space may be defined within a physical space, for example, by using a laser pointer or XR/VR controller to demarcate the larger play area within the physical space. In the course of their XR sessions, the two more XR devices may roam, surrounded by their personal safe spaces, throughout the defined larger play space because collision with other XR device users is prevented. Such collisions may be prevented because if the system detects proximity, or overlap, of a first personal safe area and a second personal safe area, or of a first personal safe area and a physical obstacle or a larger play space boundary, the system may warn one or more XR devices of the physical space of a risk of a crash. Similarly, the system may generate a warning to an XR user whose personal safe area ventures too close to, but does not quite overlap, another personal safe area or larger play space boundary.

The user of such dynamic, personal XR safe areas may result in a more efficient and dynamic allocation of the shared larger play space. Further, one or more disclosed techniques enable a user to engage in XR activity easily and reliably with the confidence that, by remaining within his safe area, he or she will avoid unexpected collisions and injuries. Also, an XR session provided by a first XR device need not be interrupted to re-draw safe areas when a second XR device is activated in the physical space.

According to another embodiment, XR sessions for XR devices sharing a physical space may be managed so that overlap or near collision of personal safe areas associated with XR devices is avoided. For example, in an XR game centered on hitting certain virtual objects, the movement of the virtual objects may be controlled so that they are perceived via the XR device to move away from nearby personal safe areas of other XR devices.

A method, system, non-transitory computer-readable medium, and means for implementing the method are disclosed for safe areas for two or more XR devices. Such a method may include: determining a first extended reality (XR) safe area size based on a first XR device user size; determining a second XR safe area size based on a second XR device user size; and in response to detecting a proximity of the first XR safe area to the second XR safe area, transmitting to the first XR device a notification indicating the proximity.

Also, in response to detecting a movement of the first XR device, the first XR safe area may be repositioned such that the first XR safe area has a circular shape with radii centered at the first XR device. In addition, in response to detecting a movement of the first XR device, the first XR safe area may be repositioned such that the first XR safe area is centered at the first XR device. The first XR safe area and the second XR safe area may be located in a common combined safe area. In response to detecting a movement of the first XR device, the first XR safe area may be repositioned so that the first XR safe area is centered around the first XR device. In addition, the first XR device may be notified by the system when the first XR safe area intersects a boundary of the combined safe area.

The proximity of the first XR safe area to the second XR safe area may be detected by determining that that the first XR device has recently moved toward the second XR device. In response to the detecting of such proximity a notification may be transmitted to the second XR device indicating the proximity. This notification to the second XR device may appear or sound of feel different on the second XR device than the notification on the first XR device.

Also contemplated is a method, system, non-transitory computer-readable medium, and means for implementing the method are disclosed for XR session adjustment. Such a method may include: determining a first extended reality (XR) safe area size based on a first XR device user size; determining a second XR safe area size based on a second XR device user size; and adjusting an XR session of at least one of the first XR device or the second XR device to avoid overlap of the first XR safe area and the second XR safe area.

In addition, in response to detecting a proximity of the first XR safe area to the second XR safe area, the system may transmit a notification to the first XR device indicating the proximity. The first XR safe area may have a circular shape with radii centered at the first XR device, and the second XR safe area may have a circular shape with radii centered at the second XR device, or the first XR safe area may have a circular shape with radii centered at the first XR device, and the diameter of the cylinder determined based on a distance between the first XR device and a handheld XR peripheral device.

Thus, a technological solution provided according to an aspect of the disclosure is the generation of personal first and second safe areas that may be visible by each XR device. In this way, mutual interference in an XR session, and collision and damage may be avoided. An XR session provided by a first XR device need not be interrupted if a second XR device becomes active in the physical space, or if one of two XR devices that are simultaneously sharing a physical space is turned off. Longer XR sessions may be obtained and the XR equipment user may be kept safer. A more effective use of the available physical space may be obtained for each XR device. At any given time during the VR session, an entire larger play space in a physical space may be effectively used for XR session(s) while keeping XR users within a dynamic, personal safe area.

Other aspects and features of the present disclosure will become apparent to those ordinarily skilled in the art upon review of the following description of specific embodiments in conjunction with the accompanying figures.

BRIEF DESCRIPTION OF THE DRAWINGS

The present disclosure, in accordance with one or more various embodiments, is described in detail with reference to the following Figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 12 illustrates an examples of an XR game or session adjustment process, according to a game adjustment embodiment of the disclosure;

FIGS. 13A-B illustrate an examples of an XR game or session adjustment process in combination with providing user feedback, according to a game adjustment embodiment of the disclosure;

FIGS. 15A-16B illustrate an example game adjustment simultaneously for XR sessions of two XR devices, according to an aspect of the disclosure;

FIGS. 17A-B illustrates an example game adjustment in combination with providing user notification of proximity, according to an aspect of the disclosure;

FIGS. 18A-B illustrate an example of the system providing XR game recommendation based on safe area size, according to an aspect of the disclosure;

DETAILED DESCRIPTION

Figure 1:
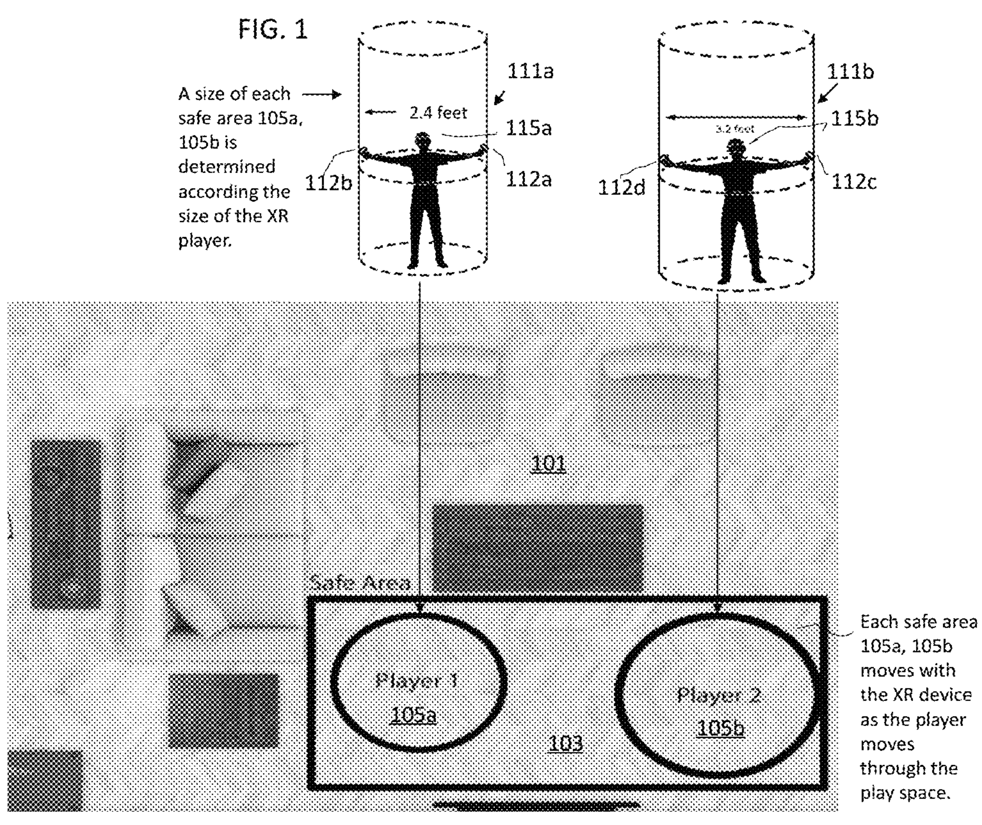
FIG. 1 illustrates an example of two extended reality devices, such as virtual reality devices, sharing a physical space with a first safe area allocated to a first XR device and a second safe area allocated to a second XR device, according to an aspect of the disclosure.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood that the embodiments and examples described herein may be practiced without these specific details. In other instances, well-known methods, procedures and components, including software, firmware and hardware components, have not been described in detail so as not to obscure the embodiments described herein. Also, the description is not to be considered as limiting the scope of the embodiments described herein.

References herein to an "XR device" refer to a device providing virtual reality (VR), mixed or merged reality (MR), or augmented reality (AR) functionality (e.g., wherein virtual objects or graphic overlays are provided in addition to real-world objects or environments visible via the device). An XR device may take the form of glasses or a headset in some instances (e.g., a head-mounted display or HMD). While some references are made to a VR device or devices, appreciate that some or all of the described techniques may be implemented with respect to any suitable XR device (e.g., an XR device that provides an MR or AR scene that is partially or wholly populated by virtual objects). For example, some or all of a real-world environment may be visible via XR devices of multiple users, and the users may generate reconfigured safe areas and a virtual partition for their XR devices utilizing the techniques discussed herein.

FIG. 1 illustrates two extended reality devices 111*a*, 111*b*, which may include an audio audio-visual component, shown by way of example as head mounted displays (HMDs) 115*a*, 115*b* worn by users. In an embodiment, the HMDs 115*a* and/or 115*b* may be VR devices. The system has generated two safe areas, 105*a*, 105*b* in the same play area 103 of the physical space 101, shown by way of example as a living room, according to an aspect of the disclosure. While sometimes referred to as play space 103, it will be understood that what is meant is an area in a physical space demarcated by a virtual boundary that may be visible via the XR (e.g., VR) device and/or that may provide a warning when crossed or is approached. The physical space may be a living room or game room, as illustrated, or may be purpose-built XR or VR recreation room. The XR or VR equipment may include a stereoscopic HMD, which may include eye-tracking sensors to control the display, one or more game controllers used as input/output devices for controlling an XR or VR application, and other XR or VR application-specific equipment, such as movement sensitive rackets and paddles, laser pointers and laser guns, laser pointers, joysticks and other controllers, smartphones, and the like. The XR devices 111*a*, 111*b* may be running different XR applications or the same XR application. For example, the XR device users may be playing entirely unrelated XR (e.g., VR) games or they may be playing the same game against/together with each other.

FIG. 1 also illustrates that the users are wearing an XR HMD 115*a*, 115*b* and holding, respectively, handheld devices 112*a*, 112*b* and 112*c*, 112*d*, such as a laser pointer or XR/VR controllers. Handheld devices 112*a* and 112*b* may also be thought of as being part of the XR device 111*a*, and handheld devices 112*c* and 112*d* may be thought of as being part of the XR device 111*b*. The system may authenticate the device user using biometric data, such as a facial, retinal or finger scan obtained from the user. In some embodiments, the device 111 may be any suitable XR device configured to display virtual objects within a scene including any suitable combination of a real-world environment, a virtual environment, and/or virtual objects. In some embodiments, the described XR or VR devices may include see-through capabilities enabling the display of some or all of a user's real-world environment. For example, the device 111 may include optical see-through (OST) capability in which light passes through the display, providing "through the glass" visibility of an environment. In an embodiment, the device 111 may include video see-through (VST) capability, wherein cameras (e.g., mounted on or within the device 111) capture images or video of the user's environment and render a corresponding video, allowing the user to view, in whole or in part, his or her real-world environment by way of the video. it is determined whether the XR device is connected to Wi-Fi and the Internet. If it is not connected to a network, then network connectivity is obtained. In an embodiment, the XR devices are connected using the same Wi-Fi network to facilitate the system recognizing them as being in the same physical space.

The system may determine whether the XR device has a safe area stored in local memory. The safe area may be stored in memory from a previous session of the VR device in this physical space. For example, the safe area may be stored as a series of x and y coordinates defining a location of the boundary in the physical space. The system may store current safe areas of more than one safe area as associated with an XR device. For example, the system may retrieve a first stored safe area for a first XR application and may retrieve a second safe area for a second XR application. By way of illustration, an XR application that typically calls for frequent or violent movement, such as a multiplayer shooting game, may have an associated stored safe area that is larger than a XR application that calls for more cerebral activities.

If a second or third XR device is activated in the physical space while a first user is already engaged in a XR session, personal safe areas for each of the first and second users may be automatically allocated dynamically. For example, if the system recognizes the XR user and had stored the size of the XR user's personal safe area, or the system may prompt each XR device user to extend one or both arms so that personal safe areas could be determined. This may cause minimal to no interruption of the XR experience. In response to the termination of the session/deactivation of a second XR device sharing the same physical space that had its own such personal, dynamic play space, the remaining XR device's personal, dynamic safe area may also be turned off to give free reign to the remaining XR device within the larger play area.

In an embodiment, depending on the game or other XR activity, the system may impel or urge the XR user to extend, and/or extend and raise, an arm holding a handheld XR control device by generating game features that call for such user actions, so that the extending/extending raising of the arm becomes an integrated part of the XR game or other activity. For example, in a tennis application, the ball may be seen to be coming from far to the right of the XR device and thus the XR user would perceive the need to reach far to the right with the XR device racket or controller in hand. In this way, the system may determine a radius of the personal safe area without interruption to the XR experience, or even without the XR device user's knowledge.

In an embodiment, the size of the personal safe area may be allocated depending on the activity level typically generated by the application active for the XR device. For example, an XR device running a game application that often calls for vigorous rapid movement, or movement over a larger area, may be allocated a safe area greater in size than one that is running an application that usually calls for more sedate activity. In addition or in the alternative, a user profile of the wearer of the XR device may be consulted to determine the activity intensity level, the area of movement, and/or frequency of vigorous movement associated with the application running on the XR device.

In an embodiment, a shape or configuration of the personal safe area may be determined based on the XR application to maximize space available for use. For example, a personal safe area that is nearly oval or is longer with respect to the lateral sides of the HMD may afford more room for movement of a user's arms in an XR tennis session, while a personal safe area that is more elongated front to back with respect to the HMD device may provide more room for movement for an XR session that tends to call for movement along that direction.

In an embodiment, the system assigns a safe area with a given radius irrespective of user size, including arm span. For example, the same radius may be assigned to each XR device, regardless of user size. According to an embodiment, an age of the user may be used to assign a radius length, for example, children under 12 may be assigned a first radius, teenagers 12-16 may be assigned a second, larger radius, and users over 18 may be assigned a still larger radius. According to an embodiment, the radius length may be assigned according to shirt, jacket or pants size. The system may retrieve such size or age information from user profiles or online sources or may prompt the user to enter such information.

The personal safe areas for the XR devices may be generated by an off-site server, for example, by an XR game server or by a SLAM network edge service, and may use Wi-Fi-based localization of the XR devices. Or, the personal safe areas may be managed locally by a central device through which XR devices connect to a larger network, such as the internet.

Figure 2:
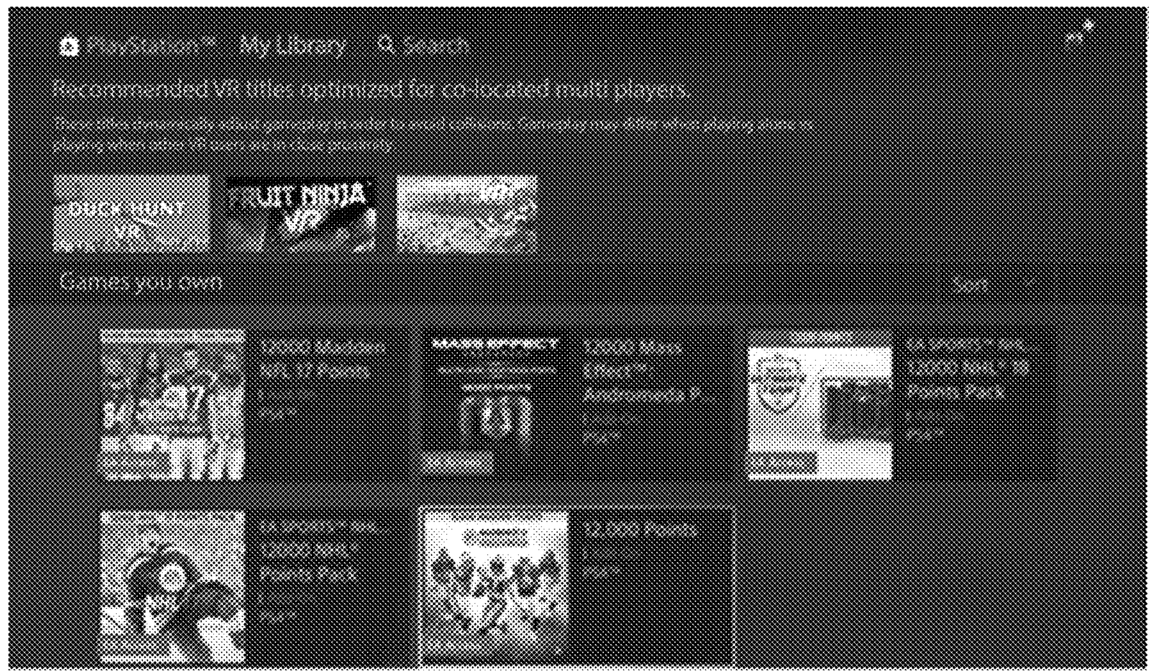
FIG. 2 illustrates an example of an XR games that may be selected or recommended, according to an aspect of the disclosure.

FIG. 2 illustrates an example of a display that may be generated to an XR device to show examples of VR games that may be available that are particularly suitable for XR devices in the same physical space. For example, these may be VR games that typically call for sudden, fast movement.

Figure 3:
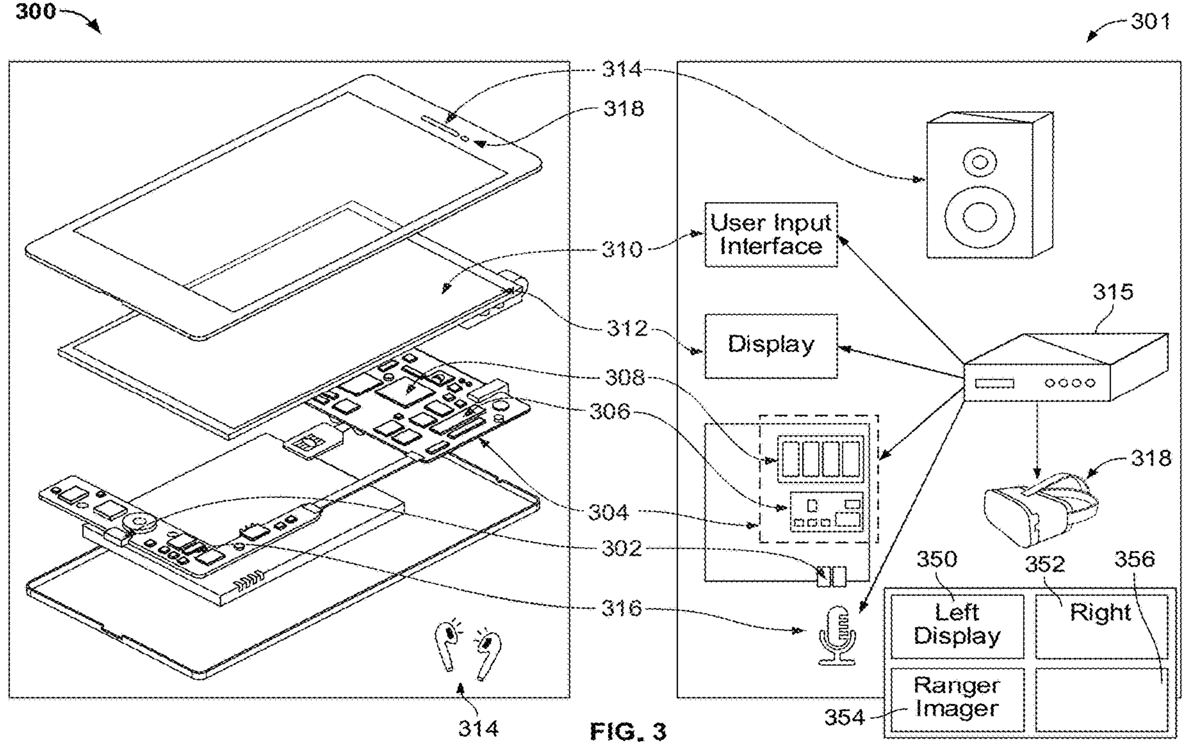
FIG. 3 is a schematic illustration of an example of a computer with peripheral devices.

FIG. 3 illustrates a computer and related hardware for an XR device 318, which may be a VR device in some embodiments. The computer may also be a network edge service devices 316 (illustrated in FIG. 4, below), such as a server, including components used for supporting safe area management. A circuit board may include control circuitry, processing circuitry, and storage (e.g., RAM, ROM, hard disk, removable disk, etc.). In some embodiments, the circuit board may include an input/output path for communicating with the HMD of the XR device and with a remote device, for example, with the network edge service 316. Each device 300/301 may receive content and data via input/output (I/O) path 312 that may comprise I/O circuitry (e.g., network card, or wireless transceiver). I/O path 312 may communicate over a local area network (LAN) or wide area network (WAN), for example, via Wi-Fi, Bluetooth, cellular or other wireless or wired connection.

Control circuitry 318 may comprise processing circuitry 320 and storage 322 and may comprise I/O circuitry. Control circuitry 318 may be used to send and receive commands, requests, and other suitable data using I/O path, which may comprise I/O circuitry, for example, for receiving user demarcations of safe area boundaries and for transmitting displays to be provided by the HMD of the XR device, including display of the virtual safe area boundary. I/O path may connect control circuitry 318 (and specifically processing circuitry) to one or more communications paths (described below). I/O functions may be provided by one or more of these communications paths, but are shown as a single path in FIG. 4 to avoid overcomplicating the drawing.

Control circuitry 318 may be based on any suitable control circuitry such as processing circuitry 320. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i9 processors) or multiple different processors (e.g., an Intel Core i9 processor and an Intel Core i7 processor). In some embodiments, control circuitry 318 executes instructions for the XR application stored in memory (e.g., storage 322). Specifically, control circuitry 318 may be instructed by the XR application to perform the functions discussed above and below. In some implementations, processing or actions performed by control circuitry may be based on instructions received from the XR application.

In client/server-based embodiments, control circuitry 318 may include communications circuitry suitable for communicating with other networks. The XR application may be implemented as software or as a set of executable instructions. The instructions for performing any of the embodiments discussed herein of the XR application may be encoded on non-transitory computer-readable media (e.g., a hard drive, random-access memory on a DRAM integrated circuit, read-only memory etc.). For example, in FIG. 3, the instructions may be stored in storage 318, and executed by control circuitry 318 of a device 318.

In some embodiments, the XR application may be a client/server application where only the client application resides on device 308 (e.g., device 318 or 300), and a server application resides on an external device or edge service network. Control circuitry 318 may include communications circuitry suitable for communicating with a server, edge service computing systems and devices, a table or database server, or other networks or servers Such communications may involve the Internet or any other suitable communication networks or paths. In addition, communications circuitry may include circuitry that enables peer-to-peer communication of user equipment devices, or communication of user equipment devices in locations remote from each other (described in more detail below).

Memory may be an electronic storage device provided as storage 322 that is part of control circuitry 318. As referred to herein, the phrase “electronic storage device” or “storage device” should be understood to mean any device for storing electronic data, computer software, or firmware, such as random-access memory, read-only memory, hard drives, optical drives, digital video recorders, solid state devices, quantum storage devices, gaming consoles, or any other suitable fixed or removable storage devices, and/or any combination of the same. Storage 322 may be used to store various types of content described herein as well as XR application data described above. Nonvolatile memory may also be used (e.g., to launch a boot-up routine and other instructions).

Control circuitry 318 may include video generating circuitry and tuning circuitry. Control circuitry 318 may also include scaler circuitry for upconverting and down converting content into the preferred output format of equipment 300. Control circuitry 318 may also include digital-to-analog converter circuitry and analog-to-digital converter circuitry for converting between digital and analog signals. In some embodiments all elements of system 300 may be inside housing of the XR display device 318. In some embodiments, XR display device 318 comprises a camera 356 (or a camera array). Video cameras may be integrated with the equipment or externally connected. One or more of cameras may be a digital camera comprising a charge-coupled device (CCD) and/or a complementary metal-oxide semiconductor (CMOS) image sensor. In some embodiments, one or more of cameras 356 may be dirtied at outside physical environment (e.g., two cameras may be pointed out to capture to parallax views of the physical environment). In some embodiments, XR display device 318 may comprise other biometric sensor or sensors to measure eye rotation (e.g., electrodes to measure eye muscle contractions). VR display device 318 may also comprise range image 354 (e.g., LASER or LIDAR) for computing distance of devices by bouncing the light of the objects and measuring delay in return (e.g., using cameras 356). In some embodiments, VR display device 318 comprises left display 350, right display 350 (or both) for generating VST images, or see-through VR images.

The XR application may be implemented using any suitable architecture. For example, it may be a stand-alone application wholly-implemented on each one of user equipment device 300 and user equipment device 301. In such an approach, instructions of the application may be stored locally (e.g., in storage 308), and data for use by the application is downloaded on a periodic basis (e.g., from the edge service network, from an out-of-band feed, from an Internet resource, or using another suitable approach). Control circuitry 318 may retrieve instructions of the application from storage 308 and process the instructions to provide VR generation functionality and perform any of the actions discussed herein. Based on the processed instructions, control circuitry 318 may determine what action to perform when input is received from user input interface 310. For example, head movement or movement of a hand or handheld device via user input interface 310. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the VR application may be downloaded and interpreted or otherwise run by an interpreter or virtual machine (run by control circuitry 318). In some embodiments, the VR application may be encoded in the ETV Binary Interchange Format (EBIF), received by control circuitry 318 as part of a suitable feed, and interpreted by a user agent running on control circuitry 318. For example, the VR application may be an EBIF application. In some embodiments, the VR application may be defined by a series of JAVA-based files that are received and run by a local virtual machine or other suitable middleware executed by control circuitry 318. Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 602-11x, etc.), or other short-range communication via wired or wireless paths. The user equipment devices may also communicate with each other directly through an indirect path via communication network.

While sometimes described as a “VR” network or system by way of example, it will be understood that implementations that include SLAM (Simultaneous Location And Mapping) technology, are also contemplated. SLAM technology allows a variety of devices, including XR equipment, HMDs, wearable devices, industrial robots, autonomous household devices, drones, self-driving vehicles, etc., to create a map of its surroundings and to locate and assist in autonomous and/or user-assisted navigation based on the map in real time. Example XR devices include VR devices, AR devices, MR devices. The field of view may comprise a pair of 2D images to create a stereoscopic view in the case of a VR device; in the case of an AR device (e.g., smart glasses), the field of view may comprise 3D or 2D images, which may include a mix of real objects and virtual objects overlaid on top of the real objects using the AR device (e.g., for smart glasses, a picture captured with a camera and content added by the smart glasses). For example, in an embodiment, the system may provide virtual boundaries of the safe area, and possibly other virtual elements of a scene for display, while the actual or real-world environment may also be displayed or be visible. In addition, equipment sold for or typically usable for MR or AR may be compatible with a system as herein discussed by displaying virtual elements of a scene, such as virtual boundaries. A map of an area may be generated based on sensor data captured by sensors onboard the SLAM-enabled device, and the location of the SLAM-enabled device on the map may be determined based on data generated by the device. One or more sensors may be positioned in, on, or at the SLAM-enabled device, or may be positioned elsewhere and capture a field of view of the SLAM-enabled device. For example, one or more stationary cameras in the vicinity of the SLAM-enabled device may provide image data, in addition to or instead of, cameras onboard the SLAM-enabled device. The device's sensors, such as one or more charge coupled devices and/or cameras and/or RADAR/LIDAR and the like, or a combination of the foregoing, collect visual data from the physical world in terms of reference points. In addition, or instead, a SLAM-enabled device may also use one or more of GPS data, satellite data, wireless network and/or Wi-Fi signal strength detection, acoustic signals, or any suitable visual positioning system (VPS) methods, e.g., using other previously scanned objects as anchors, or using any other suitable technique, or any combination thereof for determining location, movement and/or orientation. For example, a Wi-Fi positioning system (WPS or WiPS) may use Wi-Fi hotspots or other wireless access points to locate a device. An SSID (Service Set Identifier) and MAC (Media Access Control) address assigned to a NIC (Network Access Controller) may be used as parameters for locating the device in a WPS. A SLAM-enabled device may be equipped with IMU (inertial measurement unit). IMU data may be used for location/orientation/movement determination.

Figure 4:
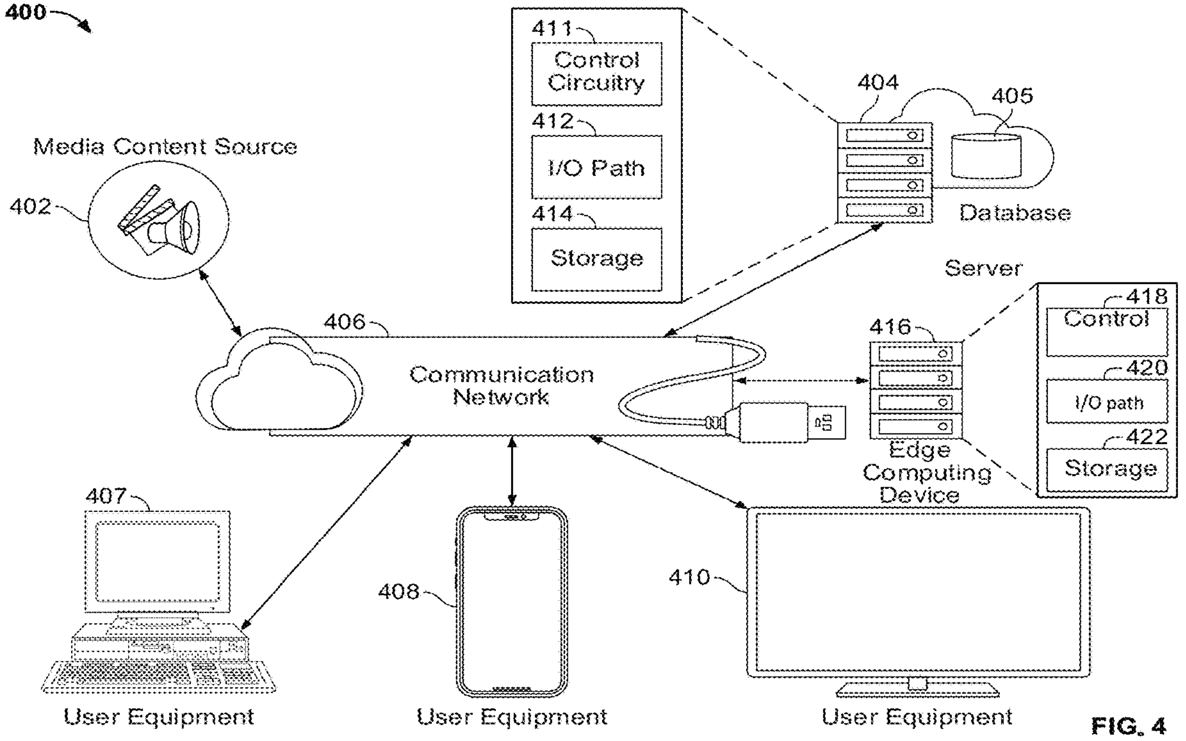
FIG. 4 illustrates networked local devices connected via a data network to remote devices.

FIG. 4 is a diagram of an illustrative system 400 for AR generation, in accordance with some embodiments of this disclosure. User equipment devices 407, 408, 410 (e.g., which may correspond to one or more of computing device 212 may be coupled to communication network 406. Communication network 406 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 406) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 4 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 406.

System 400 may comprise media content source 402, one or more servers 418, and one or more edge computing devices 416 (e.g., included as part of an edge computing system, such as, for example, managed by mobile operator 206). In some embodiments, the AR application may be executed at one or more of control circuitry 411 of server 418 (and/or control circuitry of user equipment devices 407, 408, 410 and/or control circuitry 418 of edge computing device 416). In some embodiments, data structure 300 of FIG. 3, may be stored at database 405 maintained at or otherwise associated with server 418, and/or at storage 422 and/or at storage of one or more of user equipment devices 407, 408, 410.

In some embodiments, server 418 may include control circuitry 411 and storage 414 (e.g., RAM, ROM, Hard Disk, Removable Disk, etc.). Storage 414 may store one or more databases. Server 418 may also include an input/output path 412. I/O path 412 may provide AR generation data, device information, or other data, over a local area network (LAN) or wide area network (WAN), and/or other content and data to control circuitry 411, which may include processing circuitry, and storage 414. Control circuitry 411 may be used to send and receive commands, requests, and other suitable data using I/O path 412, which may comprise I/O circuitry. I/O path 412 may connect control circuitry 411 (and specifically control circuitry) to one or more communications paths.

Control circuitry 411 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 411 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 411 executes instructions for an emulation system application stored in memory (e.g., the storage 414). Memory may be an electronic storage device provided as storage 414 that is part of control circuitry 411.

Edge computing device 416 may comprise control circuitry 418, I/O path 420 and storage 422, which may be implemented in a similar manner as control circuitry 411, I/O path 412 and storage 414, respectively of server 404 Edge computing device 416 may be configured to be in communication with one or more of user equipment devices 407, 408, 410 and also with server 404 over communication network 406, and may be configured to perform processing tasks (e.g., AR generation) in connection with ongoing processing of video data. In some embodiments, a plurality of edge computing devices 416 may be strategically located at various geographic locations, and may be mobile edge computing devices configured to provide processing support for mobile devices at various geographical regions.

Figure 5:
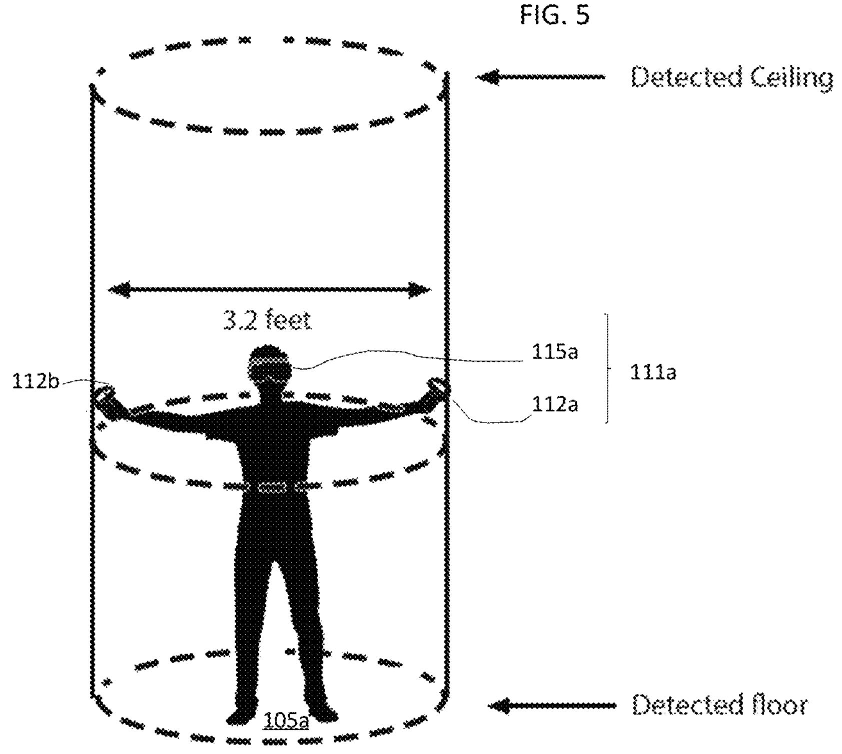
FIG. 5 illustrates an example of a safe area determined according to an arm span of an XR user, according to an aspect of the disclosure.

FIG. 5 shows a safe area 105*a* determined according to a size of a user. A distance from the HMD 115*a* to one or both of the handheld XR devices 112*a*, 112*b* may be used to determine the user size.

In an embodiment, the system may calculate a personal safe area by prompting the user to enter his/her height, and the system may estimate a person's "wingspan," or arm/should length, based on his/her height because an average person's wingspan is directly proportional to the person's height, and thus determine the size of the personal safe area accordingly. As shown in FIG. 1, the system determines a smaller personal safe area for the XR 111*a* due to the fact that the user of XR device 111*a* is smaller than the user of XR 111*b*. While two sets of XR devices are shown, XR device 111*a*, which may include HMD 115*a* and handheld devices 112*a*, and 112*b*, and XR device 111*b*, which may include HMD 115*b* and handheld devices 112*c* and 112*d*, it will be understood that more or fewer than two users may simultaneously share a physical space, each user with an XR device, including HMDs and handheld devices and an accompanying personal safe area.

A distance identified or estimated from the HMD 115 to a respective handheld device 112 may be used to determine a radius of the safe area 105 within the play area 103. In an embodiment, the user may be requested to extend his/her arm(s) while holding a handheld XR device, for example, XR or VR application-specific equipment, such as movement sensitive rackets and paddles, laser pointers and laser guns, and the like, so that an accurate arm's length/shoulder length may be obtained. As shown, due to the way systems often locate devices in space, according to an embodiment, users may be requested to extend their arms laterally away their torsos as shown in FIG. 1 for more accurate measurement.

In an embodiment, each personal safe area may have a radius larger or smaller than a first distance estimated to be the distance between the hand and the head of the user. For example, the personal area may be set to be 10-15% larger or smaller than the first distance, or may be a set margin, for example, 0.3-3 meters larger than the first distance.

Figure 6:
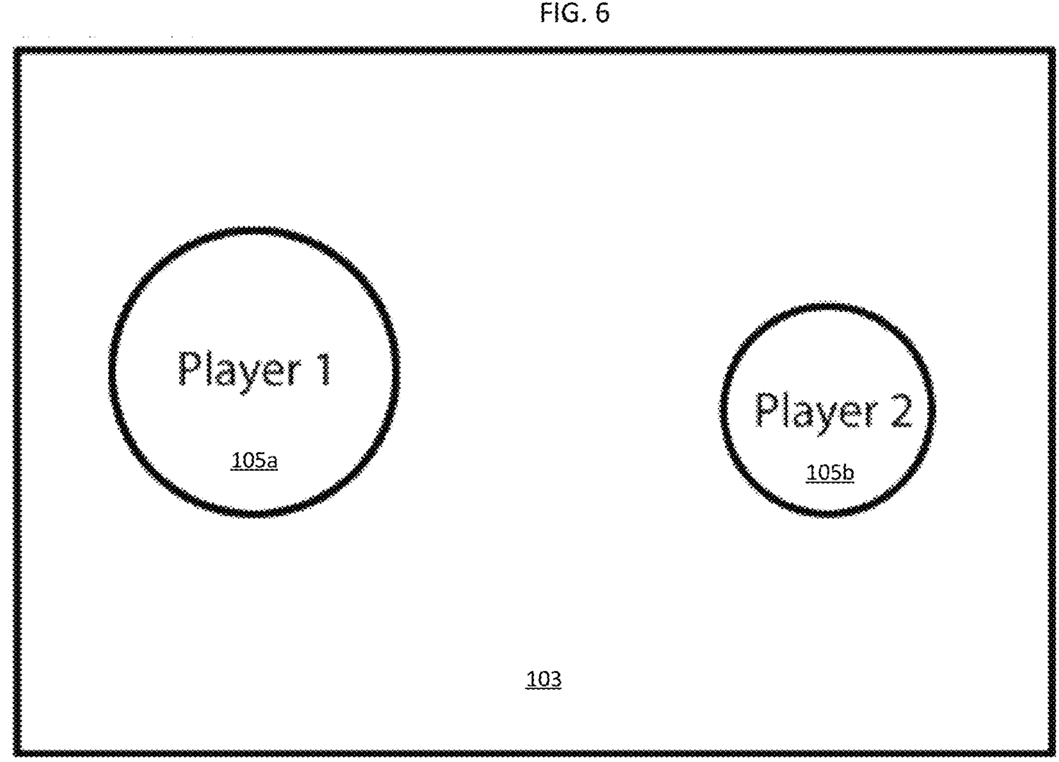
FIG. 6 illustrates an example of two safe areas sharing a play space, according to an aspect of the disclosure.

FIG. 6 illustrates two safe areas 105*a*, 105*b* surrounding respective XR devices (not shown in FIG. 6) in a play space 103. The movement of the XR devices may be continuously monitored to update the position of the safe areas. Intersection of the boundaries of a safe area with those of any other safe area of with the boundary of the play space 103 may thus be continuously monitored.

According to an embodiment, the boundaries of the personal safe areas of XR devices other than one's own XR device may be visible via one's own XR device. In an embodiment, the boundaries of the personal safe areas are not visible unless proximity or near collision or personal safe area overlap is detected.

Figures 7A, 7B:
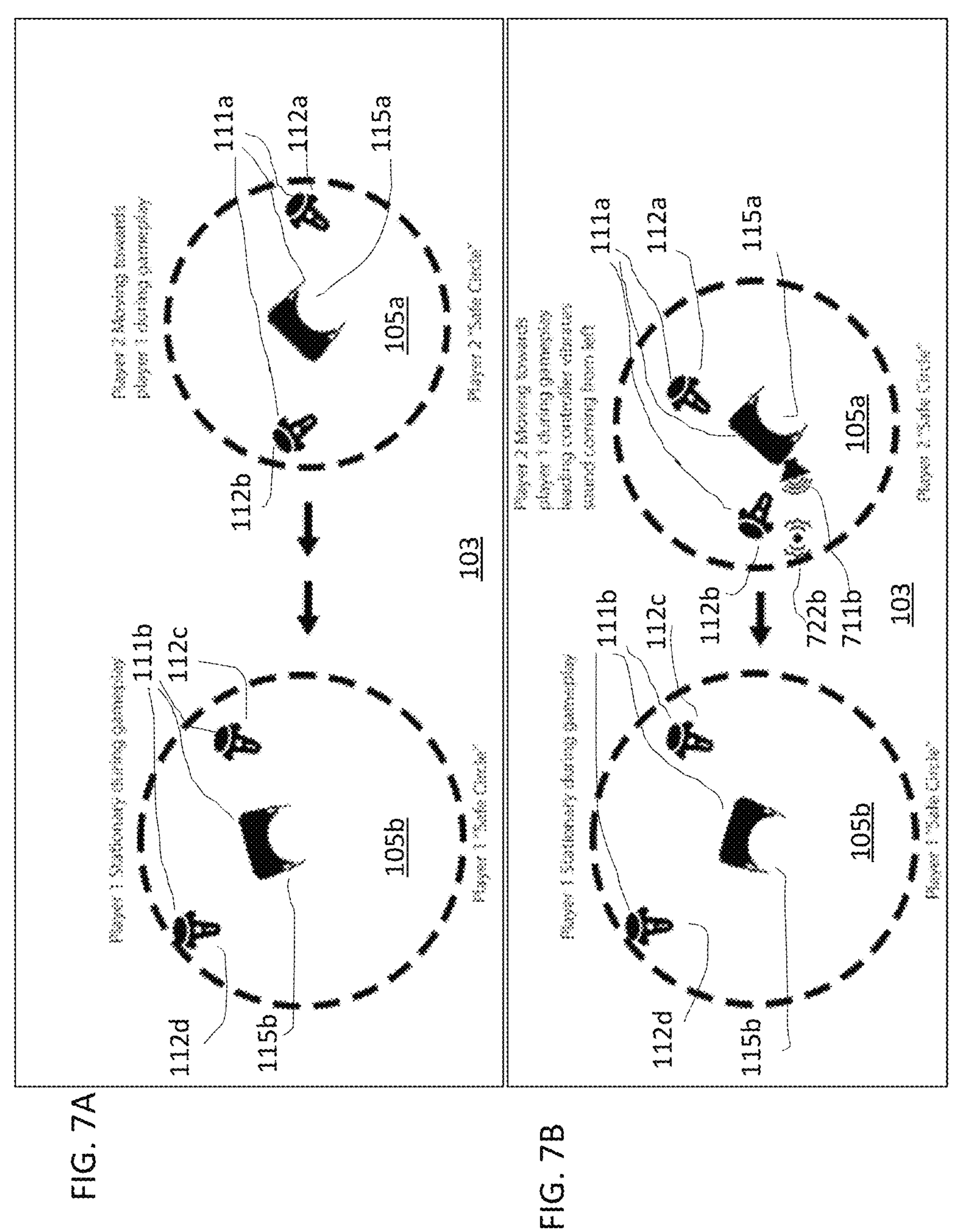
FIGS. 7A and B illustrate an example of safe areas approaching one another, according to an aspect of the disclosure.

FIGS. 7A-B illustrate an example of signals warning of collision may be provided to XR devices. A signal warning of collision may include visual, text, verbal or other auditory, and/or haptic warnings. The signal may also include an indication of which way the user is encouraged to move for safety.

As shown in FIG. 7A collision warning may be provided when the personal safe area 105*a* of a XR device 111*a* approaches the personal safe area 105*b* of a second XR device 111*b*, or overlaps or intersects it. In an embodiment, the notification or warning may indicate the direction from which the collision may be imminent. As shown in FIG. 7B, when the personal safe area 105*a* of an XR device 111*a* passes close to or intersect a boundary of the safe area 105*b* of second XR device 111*b*, a signal warning of collision may indicate the direction from which the collision may be imminent. For example, left XR hand controller 112*b* may vibrate, shake, pulse or provide other haptic indication 722*b* to the user of XR device 111*a* that second safe area 105*b* of another XR device is in close proximity, or overlaps with safe area 105*a* of XR device 111*a*. Also, left speaker 711*b* may provide verbal, sound or other audio warning or indication that second safe area 105*b* another XR device is in close proximity, or overlaps with safe area 105*a* of XR device 111*a*. The XR device 111*a* may also provide a visual notification or warning via the HMD displays. The notification may identify the XR device 111*b* or a user thereof. The notification may identify a more specific position of the second XR device 111*b* relative to the XR device 111*a*, for example, by indicating an approximate angle, such as "another user at the 11 o'clock position to your left" or the like, and may indicate an approximate distance thereto. Such directional indications may be visually provided and/or may be audible and/or haptically communicated.

According to an embodiment, the system may calculate a buffer zone between personal safe areas to prevent collision due to rapid movement of the arms or legs of a wearer of the XR device. For example, the buffer zone may be equal to half the radius of the one of the safe areas, or may be a fixed distance, for example, 1-3 meters, between personal safe areas. Or the buffer zone may be set as a percentage of one of the radius of the safe areas, for example, 15-90% of the safe areas. In an embodiment, the buffer zone may be set as a percentage, for example, 20-50%, of the average of the first and second radii.

If intersection of a boundary of a buffer zone or buffer distance of a first personal safe area is detected with that the boundary of the buffer of another safe area, the system may control XR game session of one or both XR devices to encourage additional distance but without explicitly alerting the XR users via their XR devices and without interrupting their XR experiences. However, if intersection of a boundary of a first personal safe area is detected with that the boundary of another safe area, the system may transmit alerts to one or more of the XR devices. For example, the warning may be transmitted to the XR device that is deemed to be the one that is rapidly or unexpectedly approached the other XR device. According to a further embodiment, if two or more safe areas are determined to overlap for more than a threshold period of time, for example, 1-3 seconds, or by more than a threshold distance at their maximal points of overlap, for example, 0.1-0.5 meters, then a passthrough mode may be initiated for one or both XR devices accompanied by an alert notification.

Figure 8:
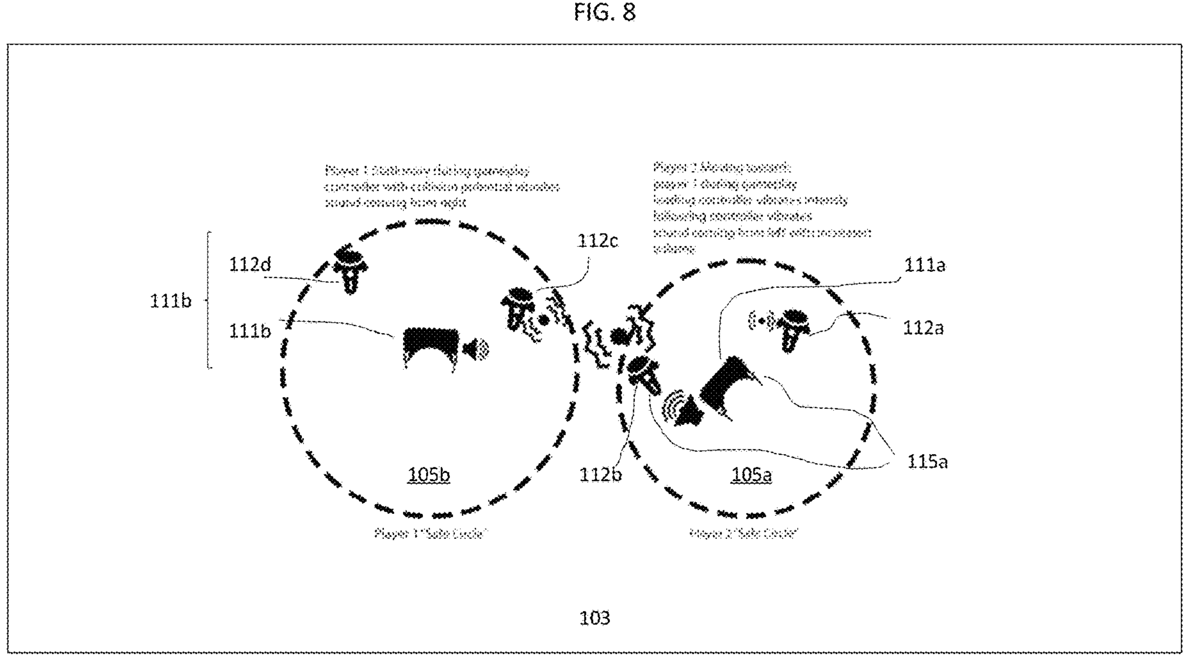
FIG. 8 illustrates an example of a first safe area approaching another safe area, according to an aspect of the disclosure.

As shown in FIG. 8, in an embodiment, the system may transmit a signal requesting the second VR device 111*b* shown in FIG. 7B also to provide such a notification or warning of the fact that XR device 111*a* is approaching, or that the safe area 105*a* of XR device 111*a* is too close to, or overlaps with safe area 105*b* of second XR device 111*b*. Such a warning or notification may be provided via the HMD 111*b* and/or one or more of the handheld devices 112*c*, 112*d*. The direction from which XR device 111*a* is approaching may also be indicated to second XR device 111*b*, for example, the handheld device 112*c* may vibrate, shake, pulse, or provide other haptic indication indicating the general direction of the approaching XR device 111*a*, and/or the HMD 115*a* may provide a voice/verbal, sound or audio indication and/or visual indication. In an embodiment, if the buffer zone discussed above is encroached upon primarily by the first XR device 111*a*, then the system transmits a request only the first XR device 111*a* to warn or notify the user to stop or to move away, so as not to disturb the XR experience of another XR user. In an embodiment, the first XR device 111*a* that is moving more toward the other may provide a stronger or more palpable notification than the more passive XR device. For example, the shaking or vibration provided by the handheld device 112*b* may be stronger than that provided by the handheld device 112*c*. However, if the safe areas 105*a* and 105*b* actually intersect then the system may generate a collision avoidance warning to both XR devices 111*a*, 111*b*.

In an embodiment, the system may initiate passthrough mode/vision one or both of the XR device, warnings may be provided, and/or a virtual guide may be displayed by the XR device to guide one or both XR device users away from each other in case boundaries of the safe areas 105*a* and 105*b* intersect. Similar remedial measures may be provided by the system when a user's XR device nears or crosses a boundary of the larger play area. The signal may also include an indication of which way the user is encouraged to move for safety.

Figure 9:
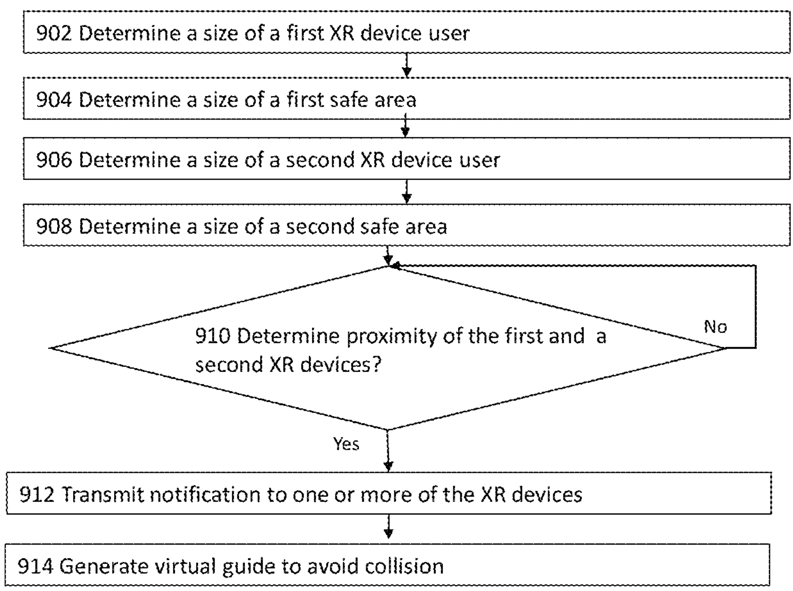
FIG. 9 is an example of a process for determining undesirable proximity and transmitting notifications accordingly, according to an aspect of the disclosure.

FIG. 9 is a flowchart that illustrates a process according to an aspect of the disclosure. The method 900 may be implemented, in whole or in part, by the system 301 shown in FIG. 3, the system 400 shown in FIG. 4, or one or more of the XR systems 111*a*, 111*b* shown in FIG. 1. One or more actions of the method 900 may be incorporated into or combined with one or more actions of any other process or embodiments described herein. The method 900 may be saved to a memory or storage (e.g., the storage 414, 422 of the systems shown in FIG. 4) or locally as one or more instructions or routines, which may be executed by any suitable device or system having access to the memory or storage to implement the method 900.

As shown in FIG. 9, at 902, a user's size is determined by the system. For example, the user's size may be the length of the arm and shoulder of the user determined automatically by identifying, as a first distance, a distance measured between HMD 115*a* and handheld XR device 112*a* or XR device 112*b*. If the system had previously stored this dimension information for the user, then if the system identifies the user, it may retrieve the previously stored information.

At 904, the system determines the size of the first safe area 105*a* according to the user size determined at step 902. The safe area may be a circular region centered at HMD 115*a* with a radius that corresponds to the first distance. In an embodiment, the radius of the first safe area may be 10-of 60% larger than the first distance, or the radius of the first safe area may be larger by a fixed amount, for example, 0.2-2 m larger than the first distance.

In an embodiment, the system may adjust the radius based on the selected game or other XR activity and/or based on the previous playing style of the user. For example, if an XR game with rapid and forceful movements, such as Fruit Ninja, or an XR sports game calling for running and rapid kicking is selected, then the system may set a larger radius for the first safe area. On the other hand, if a more sedate or slow-moving game, such as XR chess or meditation is selected, then the radius may be set to be smaller than the first distance. Similarly, if based on past user activity, it is determined that the user of the first XR device has often engaged in rapid and violent movements when using a particular XR application, then a wider berth may be afforded by generating a radius that is larger than the first distance for the first safe area 105*a*. A movement vigor score may be assigned based on one or more of such factors, and the radius of the XR device's safe area increased, or otherwise adjusted, accordingly. A larger radius may be set for the second XR device 111*b*, and/or a larger radius may be set for the first XR device 111*a* based on the movement vigor score of one user pattern/game activity level. Or, the buffer zone between the first XR device 111*a* and other XR devices may be increased based on the movement vigor score.

At 906, the system determines a user size for the second XR device 111*b* by determining a second distance based on the arm span (sometimes referred to as "wingspan") of the user of the second XR device, as discussed above. This may be done substantially at the beginning of an XR session, or if the first XR device 111*a* has already begun, an XR session and the second XR device 111*b* is detected to be turned on or determined to start an XR session, then the system may commence the safe area determination for both the first and the second XR devices. Similarly, a safe area may be determined for an XR device if a person or object is detected in a physical space being used in an XR session.

At 908, the system determines a size of the second safe area 105*b*. The radius may be set to be substantially equal to the second distance, or, as discussed, may be adjusted.

At 910, the system determines proximity of the first and second XR devices 111*a*, 111*b*. The system may determine that the first and second safe areas 105*a*, 105*b* of the first and second XR devices 111*a*, 111*b* are closer to each other (at their nearest points) than the length of a buffer zone. Or, the system may determine that boundaries of the first and second safe areas 105*a*, 105*b* of the first and second XR devices 111*a*, 111*b* intersect.

The system may also determine potentially undesirable proximity by determining a speed with which the first and second XR devices 111*a*, 111*b* are approaching each other, or by determining an acceleration of one or both of the first and second XR devices 111*a*, 111*b* approaching each other. Using such an approach, the system determines a speed and/or acceleration of one of both the first and second XR devices 111*a*, 111*b* and may determine whether the XR devices are getting nearer to each other and are within a threshold distance. The speed or acceleration may be determined based on the speed of either XR device or may be determined based on the rate at which both XR devices are approaching each other. For example, if the first XR device 111*a* is approaching the second XR device at speed x but the second XR device 111*b* is moving away from the first XR device at speed x/2 than the rate at which both XR devices are getting closer to each other is mitigated. The threshold distance, for example, may be 1-4 meters, or the threshold distance may be determined as percentage, for example, 50-200%, of the radius of the safe area of the XR device that is moving toward the other XR device. If so, then this may trigger a notification to one or both of the first and second XR devices 111*a*, 111*b*. In an embodiment, the system may transmit notification only if the speed exceeds a threshold speed or threshold acceleration.

If such proximity is determined, then at 912, the system may transmit a request to one or both XR devices 111*a*, 111*b* to provide a warning or other notification of the proximity. The warning or notification may increase in visibility if the XR device users fails to take timely corrective action.

At 914, the system may generate a virtual guide to one or both the first and second XR devices 111*a*. 111*b* to prevent collision. The system may determine the shortest route back to the safe area allotted to the XR device, or may determine a route that leaves a significant margin of safety between the XR device and other XR devices using the physical space.

This route may be transmitted to the XR device to be provided as guidance information to the XR device user. For example, the virtual guide may be seen as one or more of arrows showing the user which way to move, bars of a cage showing a user which way not to move, and/or a visual indication of the direction from which the other XR user is approaching. The virtual guide may also, or instead, include verbal or other audio guidance (e.g. "step to your left," "avoid impact approaching from your right," an alarm signal, or the like), and a tactile guide, such as haptic notification, which may be provided by a handheld XR device. Spatial audio, for example using the left and right speakers of the HMD, may be used to provide a clue of direction from the sound. The system may also request that other devices nearby, for example, a personal digital assistant, television, smartphone or other networked devices in the play area provide such an alert or other notification.

Figure 10:
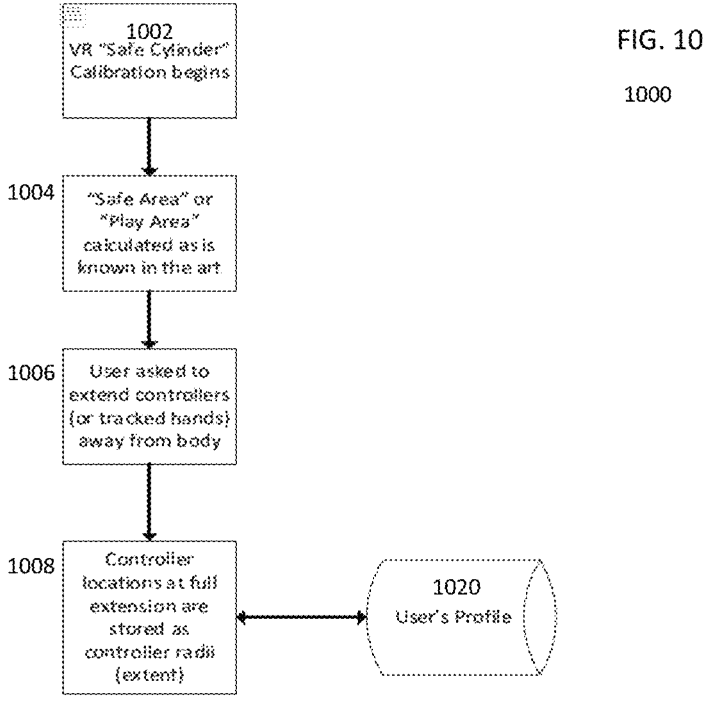
FIG. 10 illustrates an example of a process for determining a safe area, according to an aspect of the disclosure.

FIG. 10 illustrates a method 1000, according to an aspect of the disclosure, for obtaining user size information and setting a safe area radius. At 1002, the process starts for determining a personal safe area or safe cylinder.

At 1004, the system may determine a larger play area or place space in the physical space available. For example, the larger play area may be demarcated by a user using XR handheld device, such as a laser pointer.

At 1006, The user the system may prompt the user to extend his or her arm so that a first distance between the HMD and the VR handheld device may be determined. The system may prompt the user to extend his or her arm and to raise it roughly parallel to the floor. The first distance may be retrieved from a user profile 1020 if previously stored, may be entered by the user in response to a prompt, or may be estimated based on the user's height, for example, may be estimated as approximately half of the user's height. The user's height may be obtained from the user profile 1020 or may be entered by the user in response to a system prompt.

At 1008, the system may determine the radius of the personal safe area based on the first distance determined. A buffer distance may also be determined based on the first radius or otherwise. this information may then be stored in user profile 1020.

Figure 11:
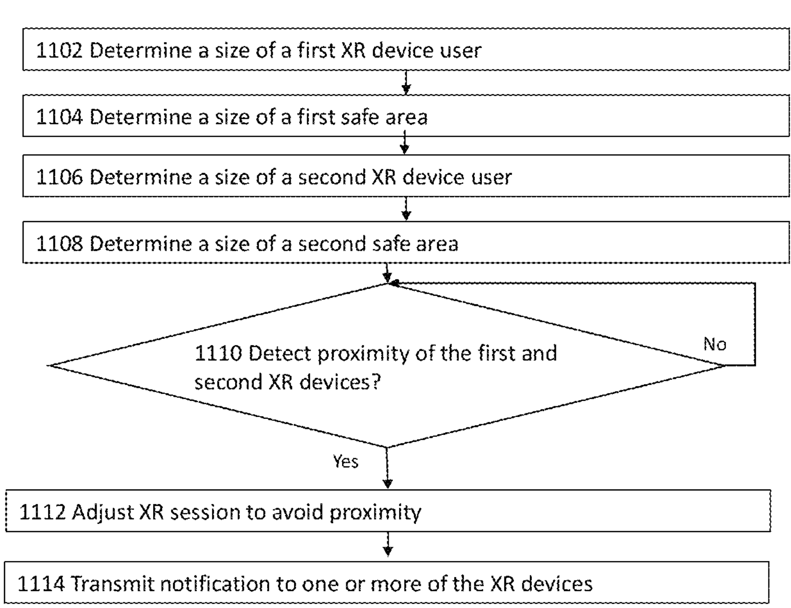
FIG. 11 is an example of a process for determining undesirable proximity and, in response, XR session adjustment, according to a game adjustment embodiment of the disclosure.

FIG. 11 is a flowchart that illustrates a process for a session adjustment embodiment, according to an aspect of the disclosure. The method 1100 may be implemented, in whole or in part, by the system 301 shown in FIG. 3, the system 400 shown in FIG. 4, or one or more of the XR systems 111*a*, 111*b* shown in FIG. 1. One or more actions of the method 1100 may be incorporated into or combined with one or more actions of any other process or embodiments described herein. The method 1100 may be saved to a memory or storage (e.g., the storage 414, 422 of the systems shown in FIG. 4) or locally as one or more instructions or routines, which may be executed by any suitable device or system having access to the memory or storage to implement the method 1100.

As shown in FIG. 11, at 1102, a user size is determined by the system. The user size may be determined or estimated in one or more of the ways discussed above. Arm span may be estimated from a height of the HMD from the floor when the wearer of the HMD is standing as these are comparable for most humans.

At 1104, the system determines the size of the first safe area 105*a* according to the user size determined at step 1104. The safe area may be a circular region centered at HMD 115*a* with a radius that corresponds to the first distance. The radius may be set to be half the height of the HMD from the floor. In an embodiment, the radius of the first safe area may be larger than the first distance, as discussed above, for example, system may adjust the radius based on the selected game or other XR activity and/or based on the previous playing style of the user. The radius may be adjusted to be larger or smaller based on the selected game or other XR activity of the first XR device 111*a* and/or based on the previous playing style or playing pattern of the user first XR device 111*a*.

At 1106, the system determines a user size for the second XR device 111*b* by determining a second distance based on the arm span or "wingspan" of the user of the second XR device, as discussed above. The second user's arm span may be determined in a same or different manner different from the manner in which the first user's arm span is determined.

At 1108, the system determines a size of the second safe area 105*b*. This may be done according to one of the ways discussed above.

At 1110, the system determines proximity of the first and second XR devices 111*a*, 111*b*. The system may determine a distance between the first and second XR devices 111*a*, 111*b*, and deduct a sum of their radii. If this number equals zero or less, then the system may determine that the boundaries of the XR devices' safe areas intersect. Or, the system may determine a distance between the first and second XR devices 111*a*, 111*b*, deduct a sum of their radii, and deduct a buffer distance, and the system may determine that the XR devices are too close if this this number is zero or less.

If proximity is determined, then at 1112, the system may adjust the XR game session or other type of XR session to get the XR devices farther away from each other. To do this, the system may do in several ways, including one or more of the following:

1. Bias the direction of movement of virtual balls or other virtual game objects with which the user interacts during the VR session, for example, by instructing an XR game engine to cause virtual balls to be seen to fall to the right of the VR user, if it is determined that the XR device is to move right to avoid proximity. On the other hand, if an aim of the XR game is to avoid contact with some virtual objects, then those virtual objects may be seen as coming from the left to cause the XR device to move to the right.
2. Adjust virtual game boundaries or session virtual terrain. The virtual area where the game or other action is seen to take place may be shifted and/or shrunk so that the XR user is caused to adjust user movements accordingly. For example, a virtual tennis court may be seen as being shifted to the right, if the system needs to move the XR device right.
3. Adjust/skip one or more game levels. Some game levels may be more challenging or call for more vigorous or more frequent movement. Such levels may be skipped or their levels may be adjusted.

One or more of such adjusting measures may be used to prevent or to stop proximity. Such adjusting measures may be implemented in a way to avoid or to reduce interference with the continuous XR user experience. In an embodiment, the XR session of the first XR device that is detected to be the one primarily moving toward the second XR device is adjusted, but not the XR session of the second XR device. For example, if the first XR device is detected to be moving rapidly toward the second XR device, or accelerating rapidly toward the second XR device, or has covered most of the distance toward the second XR device, then the XR session of the first XR device may be adjusted. According to another embodiment, the XR sessions of both the first and second XR devices is adjusted.

According to another embodiment, the XR device may be requested to provide notification to the user that one or more such measures for adjusting the game session have been implemented, as shown at 1114. In an embodiment, the XR user is not notified that such measures for adjusting the game session have been implemented for his/her XR session to minimize interrupting the XR session.

In an embodiment, such collision avoidance may be attained by the system providing a circular flow of movement for the XR devices through the larger play area defined in the physical space. For example, XR game sessions may be controlled so that the XR users are urged to move in a circular pattern or other pattern to avoid personal safe area intersection or overlap.

FIG. 12 is a flowchart illustrating a method 1200 in which a second XR device is detected to become activated when a first XR device is already in a physical space. At 1202, the system detects the activation or arrival of an XR device, such as an HMD, in a physical space.

At 1204, safe areas for one or more devices XR devices are calculated by obtaining the radii of each safe area as discussed above. As shown in FIG. 12, the radii may be previously stored in a user profile or account.

The location of the XR device is determined, as shown at 1206. The safe area may be determined to be a two-dimensional circle centered on the HMD. Or, the safe area may be determined to be a cylinder with radii centered on the HMD, starting on the floor and ending at the ceiling or at the HMD.

As shown at 1208, virtual safe areas around each XR device are calculated. According to an embodiment, each safe area may be visible to the XR device wearers as a virtual circle on the floor or as a virtual cylinder. In an embodiment, XR device wearers may see their own safe area boundaries, but not those of others. Or, XR device wearers may the boundaries of safe areas of other XR devices but not those of their own.

As shown at 1210, the boundaries of each safe area are continuously moved in response to detection of movement of the XR device though the play space. In an embodiment, the system sets the safe area as a sphere, or spheroid, centered on the XR device.

At 1212, the system determines whether it has detected a location change of the XR device. If not, processing returns to 1210 until a location change is detected.

If yes, then this information may be relayed to the cloud and/or local game engine, and at 1214 proximity of two or more XR devices is determined according to one or more of the ways discussed above.

At 1216, the XR session, such as the XR game session, may be adjusted to cause cessation of the proximity condition. One or more measures discussed above may be implemented and this is rendered to the XR device or XR devices 1218.

FIG. 13 shows a process 1300 that is performed when a second XR device 131*b* is determined to be active in a larger play area in which a first XR device 111*a* is already active. At 1302, the system detects a presence of a second XR device 111*a* in the play area or in the physical space in which the first XR device 111*a* may already be engaged in an XR session, such as a VR.

At 1304, a second distance is determined for the user of the second XR device 111*b* approximating half this user's arm pan, and a radius of the second safe area 105*b* for the second XR device 111*b* is thus determined. This information may then be stored in a user profile 1350, which may be the same storage area or device, or may be a different storage area than the one in which the user profile 1020 of the user of the first XR device 111*a* is stored.

At 1306, the distance from the HMD to the floor may be detected. In this way, the height of the user of the XR device may be approximated. According to an embodiment, the radius of the personal safe area may be set as half of this height.

At 1308, the height of the ceiling is detected or is retrieved from a database if previously known. For example, a grid outline may be created using a handheld controller 112 near the floor, for example, while in passthrough mode. A grid outline may also be directed to the ceiling using the handheld controller 112 in a similar manner. In this way, both the floor and the ceiling may be defined for the system. The system may thus know the distance from floor to ceiling, and may also thus know a distance of the handheld device 112 from the floor and ceiling. This information may be used by the system, for example, for determining when reaching by the user for virtual objects may cause the user to bump a hand or handheld controller into the ceiling or may cause the a swing of the user's arm to collide with another user or nearby objects.

A three dimensions personal safe cylinder may thus be determined at 1310 based on the distance from floor to ceiling as the height of the cylinder and using the radius determined as discussed above. Throughout the XR session, movement of the personal safe cylinder can thus be tracked around the XR device, as shown at 1312. For example, a Wi-Fi signal may be used to track the XR device and thus the boundaries of the safe area may be known.

Figure 13B:
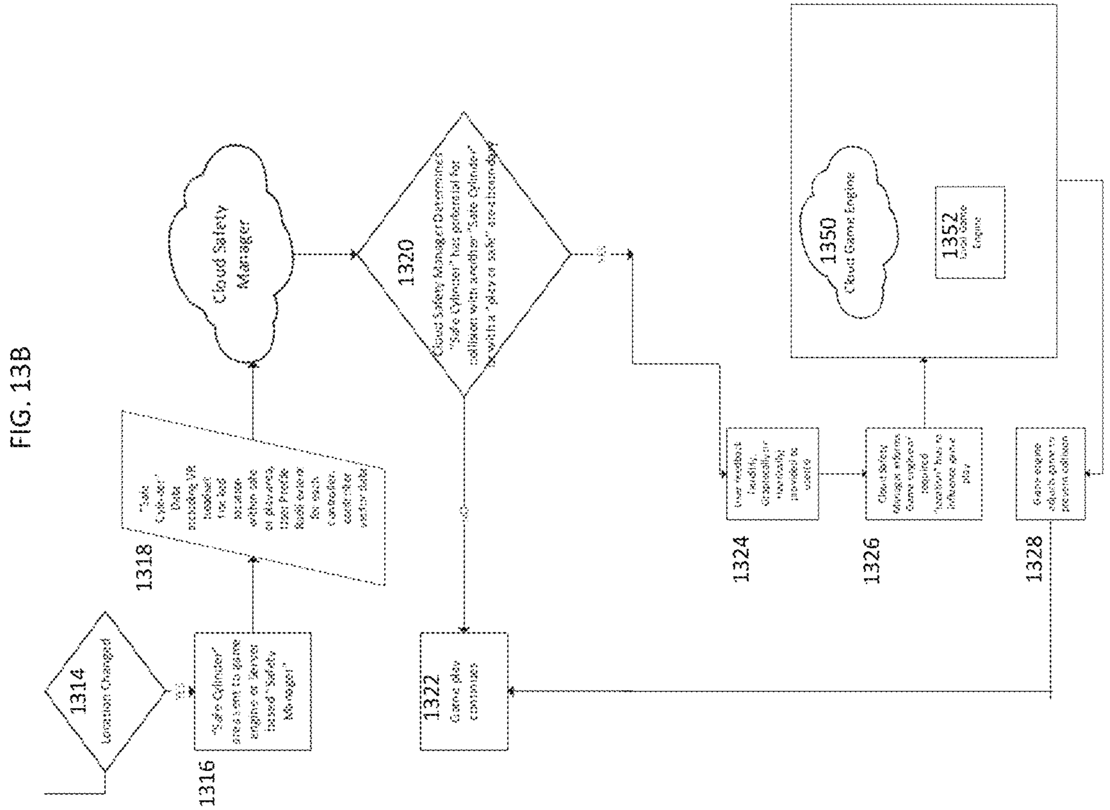

At 1314 of FIG. 13B, the system determines whether the XR device has changed location. If yes, then processing continues to 1316. If not, then the system continues to monitor for movement.

At 1316, the safe area or safe cylinders are transmitted to a safety manager of a game engine. This game engine may be located locally or offsite remote from the XR devices.

At 1318, safe area data radius data and the location of the boundaries of the safe area changed as a result of the XR movement are transmitted in real time to safety manager. The safety manager may be located with the game/XR session server, at an XR device vendor server, or elsewhere in the cloud.

At 1320, the safety manager determines the potential for collision. As discussed, such factors as intersection of the boundaries of the safe areas, the approaching of safe areas to each other to within less than the buffer distance, a speed or acceleration of the XR devices with respect to each other and the like may be used for this determination. In an embodiment, past user behavior with the currently running XR game or other XR application may be consulted for the determination. For example, it may be determined that the current user in previous such XR sessions moved quickly, erratically, or suddenly, moved his/her arms or legs forcefully or abruptly or the like. A movement vigor score may be set based on such prior user movement, and this score may be used to increase the buffer distance, to decrease the time before a collision notification or a request to move away notification is transmitted when the XR devices come nearer to each other, or to decrease a threshold speed or acceleration required to trigger such a warning or notification.

If at 1320 it is determined that the potential for collision is low, processing continues to 1322 and game play continues. If at 1320 it is determined that the potential for collision is high, processing continues to 1324 for remedial measures.

At 1324, the system may request the XR device to provide feedback to the user. If the potential for collision is moderate or moderately high, then the system may initially request the XR device to provide feedback advising the user or users that the safe areas are approaching one another and may provide guidance for user movement.

At 1326, the system may adjust or manage XR game or XR session activity, as discussed below, to decrease the potential for collision. This may be performed in addition to, or instead of, the transmission of requests to the XR device to generate warnings or other notifications to the user. This request to adjust or to manage the XR session activity may be transmitted to a game engine 1350 located remotely and/or to a local game engine 1352.

At 1328, the game engine may adjust the game accordingly. One or more of the measures for adjust the XR session may be implemented. The XR session may continue uninterrupted at 1322.

Figure 14A:
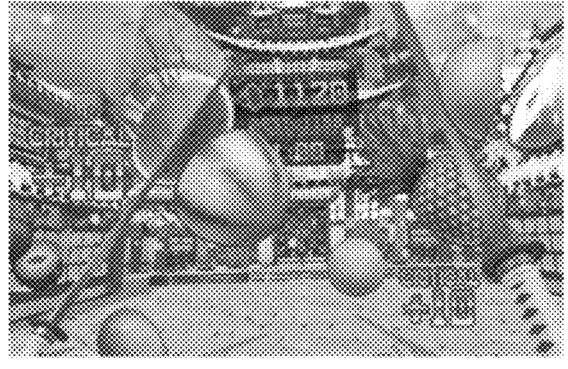
FIGS. 14A-B illustrates an example game adjustment for an XR device session, according to an aspect of the disclosure.
Figure 14B:
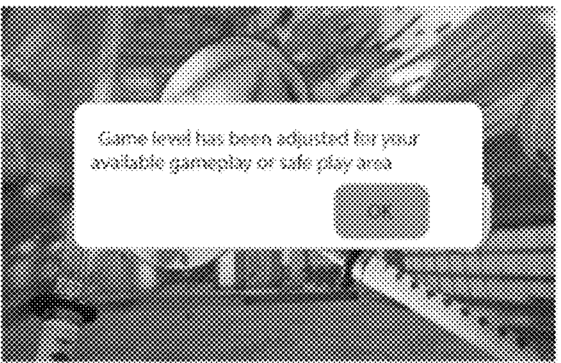

FIGS. 14A and 14B illustrate an example of XR game session adjustment in response to detection of a proximity condition. FIG. 14 illustrates a virtual field of play in a particular game level in a game called Fruit Ninja when sufficient game play area exists.

FIG. 14B shows a shrunk virtual field of play in response to detection of a proximity condition. Such an adjustment may also be used in combination with virtual object movement control to cause the XR device user to move in a particular direction as necessary to move away from one or more other XR devices.

Figures 15A, 15B:
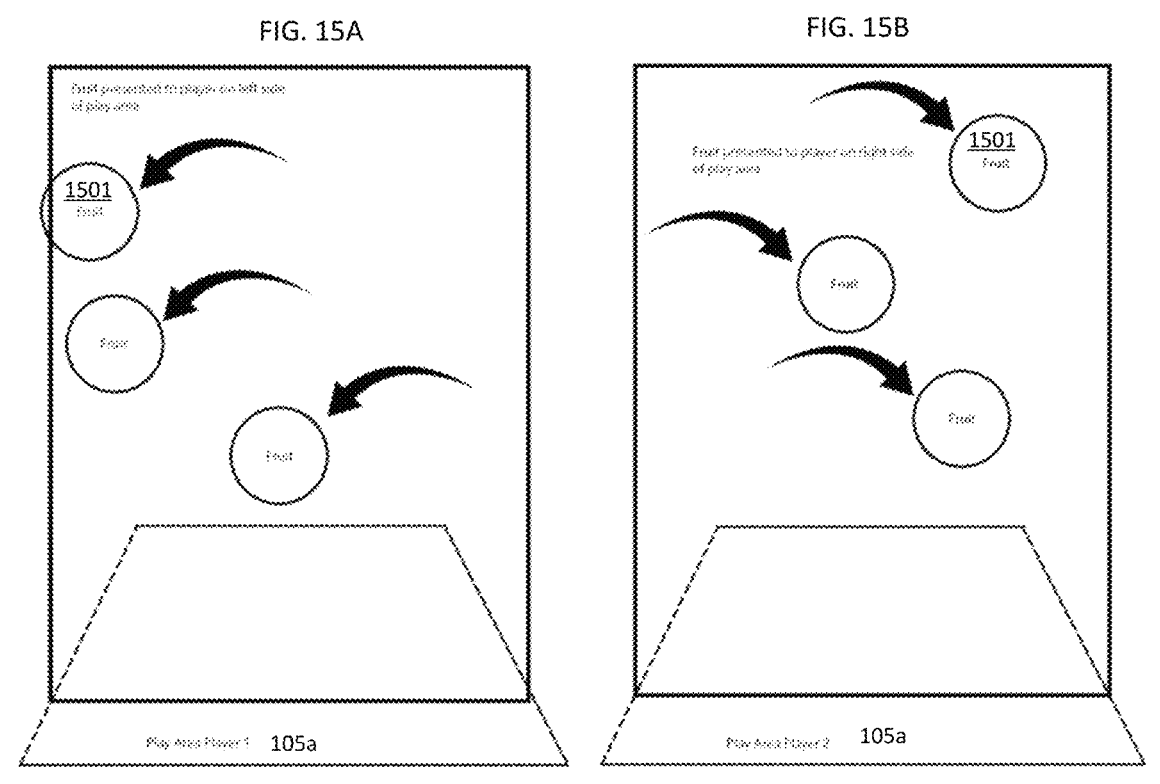

FIGS. 15A and 15B show virtual object control in a XR game session in response to detection of an XR proximity condition. In FIG. 15A, the XR user is made to see via the XR device 111 fruits 1501 in Fruit Ninja as moving to the XR user's left-hand side. This will tend to cause the XR device user to move left or at least to swing/strike left with the handheld XR device 112 to cut the virtual fruits. Conversely, FIG. 15B shows the fruits 1501 as moving to the XR user's right-hand side, when the system determines that the XR device is to be caused to move right to avoid collision or to mitigate a proximity condition.

Figures 16A, 16B:
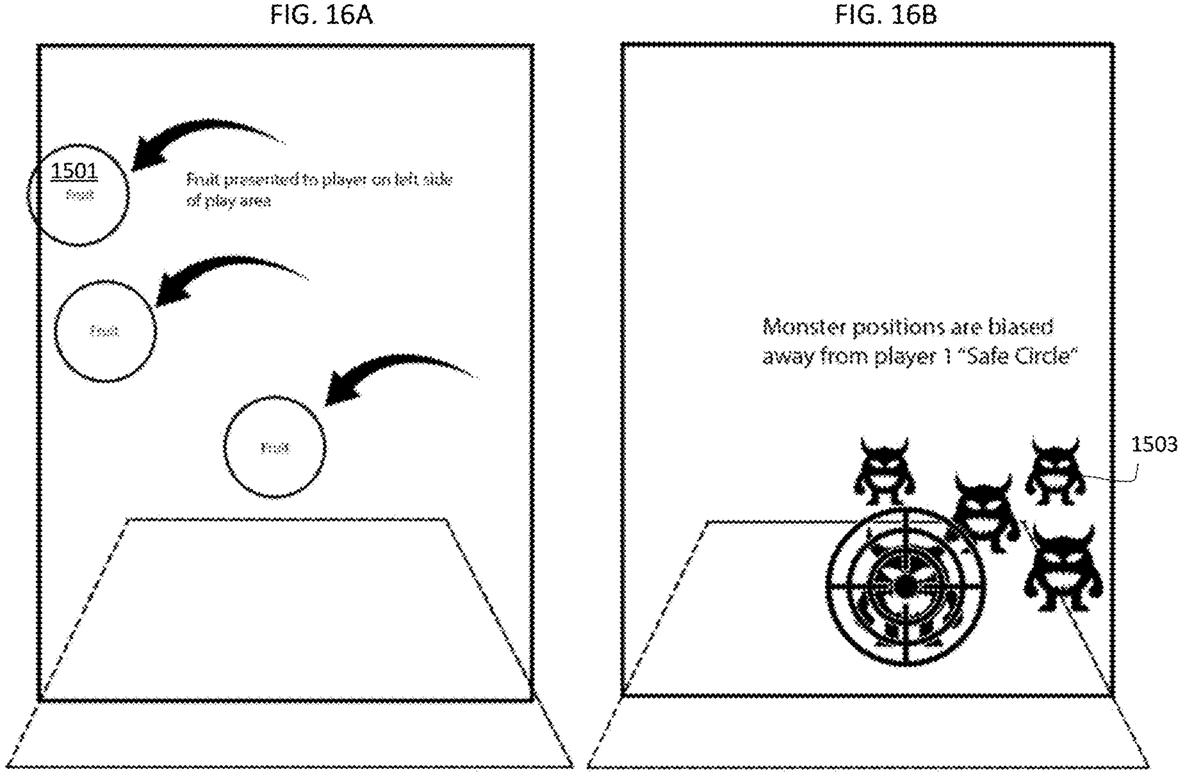

FIGS. 16A and 16B show virtual object control in a XR game session in response to detection of an XR proximity condition. In FIG. 16A, the XR user of a first XR device 111*a* is made to see via the XR device 111 fruits 1501 in Fruit Ninja as moving to the XR user's left-hand side. At the same time, second XR user of second XR device 111*b* sees monsters 1503 as moving to the XR user's right-hand side. Each XR device may be using a totally different XR application and the system may separately adjust the session of each one. For example, the first XR device 111*a* may be using a VR game, such as Fruit Ninja developed by a first VR game maker, while the second XR device 111*b* may be using a different XR game or other application but the system may adjust game features, including for example, direction and/or size and/or appearance of virtual objects, game flow and the like for each XR session independently.

Figures 17A, 17B:
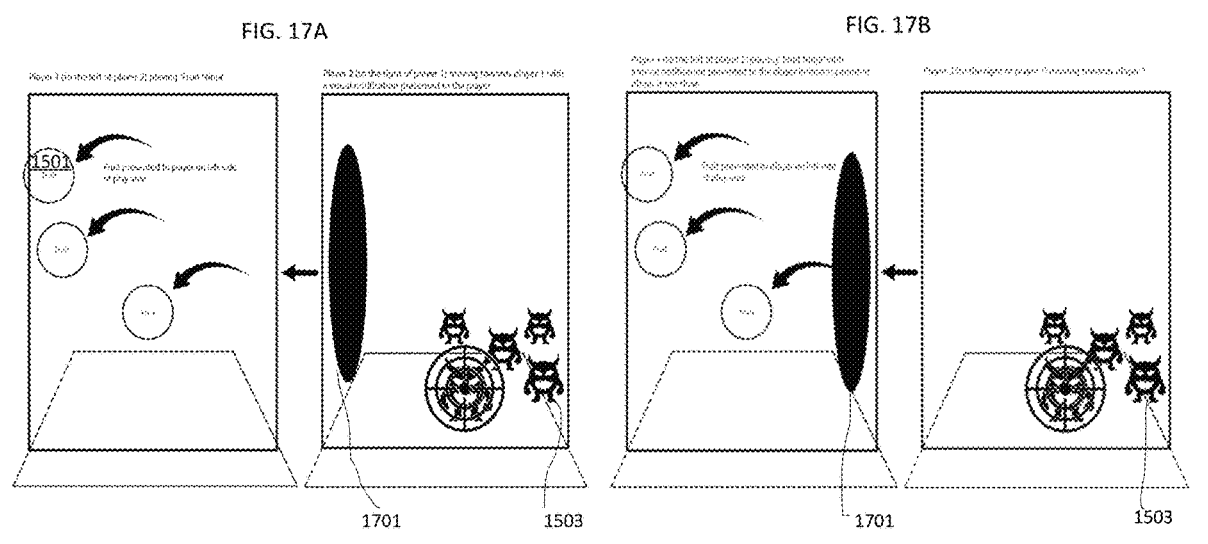

FIGS. 17A and 17B also show virtual object control in a XR game session in response to detection of an XR proximity condition. FIG. 17A shows the XR user of a first XR device 111*a* is made to see via the XR device 111 fruits 1501 as moving to the XR user's left-hand side. At the same time, second XR user of second XR device 111*b* is made to see monsters 1503 as moving to the XR user's right-hand side.

Also shown in FIGS. 17A and B are proximity indications 1701 showing the XR user a proximal presence of another XR user is located. According to an embodiment, one or both XR users may be made to see the proximity indications 1701 when a proximity condition is detected. In an embodiment, if a user of a first XR device 111*a* is approaching the second XR device 111*b* with greater speed, greater acceleration, with faster bodily movements, with an XR game that tends to call for more forceful or more sudden movement, or for movement through a greater span of physical space within a time interval, or the like is caused to see the proximity indication 1701, but not the user of the second XR device 111*b* so as to minimize interruption of the XR experience of the user of the second XR device 111*b*. Or, both XR users may be enabled to see such respective proximity indications 1701. A signal warning of collision may include visual, text, verbal or other auditory, and/or haptic warnings. In an embodiment, such audible and/or haptic notifications or warnings may indicate the direction from which the collision may be imminent. As shown, in FIGS. 17A and 17B, the notifications or warnings of the proximity condition are combined with XR session adjustment, as discussed above, to provide for safety of the XR users with minimal interruption of the XR experience.

Figure 18B:
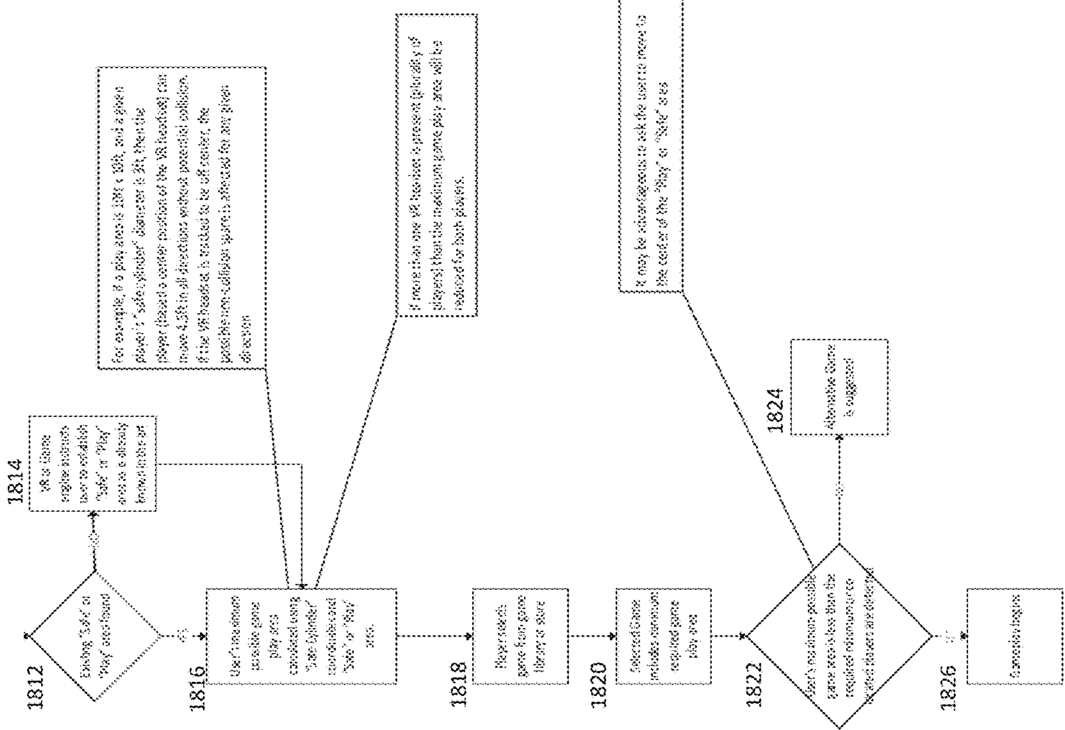

FIGS. 18A and 18B illustrate a process 1800 for suggesting XR applications based on the size of the safe areas. At 1802, the radii of safe areas are determined. For example, the radii may be based on previously known play area radii of the users or based on user size measurements as discussed above.

At 1804, the system determines the distance from the HMD to the floor. In addition or in the alternative, the system may determine the distance between the floor and the ceiling in the physical space, as described above.

Based on the radius determined for each user, and based on other the height information, at 1806 the system creates a safe area for the XR device. The system determines whether more than one XR device is currently active in the physical space, at 1808. The game engine may request the predefined play space and/or safe area that has been created for the current location/room.

At 1812 shown in FIG. 18B, the system determines whether an existing or previous safe area for the user currently using the XR device, or for the XR generally, is found. If it is not found, then at 1814 the safe area may be established as discussed above.

If the safe area has been established, then at 1816, a maximum likely game play area may be calculated for the XR device based on the safe area that has been determined. By way of example, if the play area is 3 m by 3 m and the diameter of the safe area is 1 m, then, assuming the XR device is in the middle or near the middle of the play area, the XR device user would have 1 m to move in each of the four directions from the center of the play area. This amount of room for maneuver may be acceptable depending on the nature of the game. If more than one XR device is active in the physical area, then this the amount of room for movement would be significantly reduced. Thus, the number of XR devices active in the same location/room also has to be taken into consideration, as discussed below.

At 1818, the XR user selects a game from the game store or from those available in a library for the XR device 111*a*. An example of such a library is illustrated in FIG. 2. At 1822, the system determines whether the user's maximum likely play area for the selected game with the first XR device 111*a* is less than what is needed for the recommended minimum for the game selected. As discussed, this would depend on factors such as:

- type of game selected;
- the level of the game selected;
- previous known user patterns for this game's use by this user;
- the number of other XR users active in the space;

the XR games or applications currently being used by the other XR devices;

the level of the XR games or applications currently being used by the other XR devices;

the sizes of the safe areas of those other XR devices;

the known user patterns—movement vigor—of those using the other XR devices.

For example, if it is determined that one or more of those other users typically roam over a large physical space when using the XR applications with which they are currently engaged, then this may tend to shrink the available space available for the first XR device 111*a*. Various types of VR sessions often entail much physical movement, including active or physical VR games, such as VR fitness games and games that are designed to provide a "workout" and require physical effort, such as boxing or simulated athletic events, VR adventure games, in which users may be tasked with completing quests or exploring new environments and require movement within and around the virtual space, VR simulation games, in which users perform movements that mimic real-life actions, and VR rhythm games, in which users move in time with music.

Thus, if the XR application or XR game selected by the user of the first XR device 111*a* is deemed to be unsuitable for use at the current time, then an alternative XR game or other XR activity may be suggested at 1824. If the XR application or XR game selected is deemed to be suitable because the maximum likely game area is deemed to be less than that required for the physical space in view of the factors above discussed then the processing proceeds to 1826 in game XR game session or other XR activity may begin.

Figure 19:
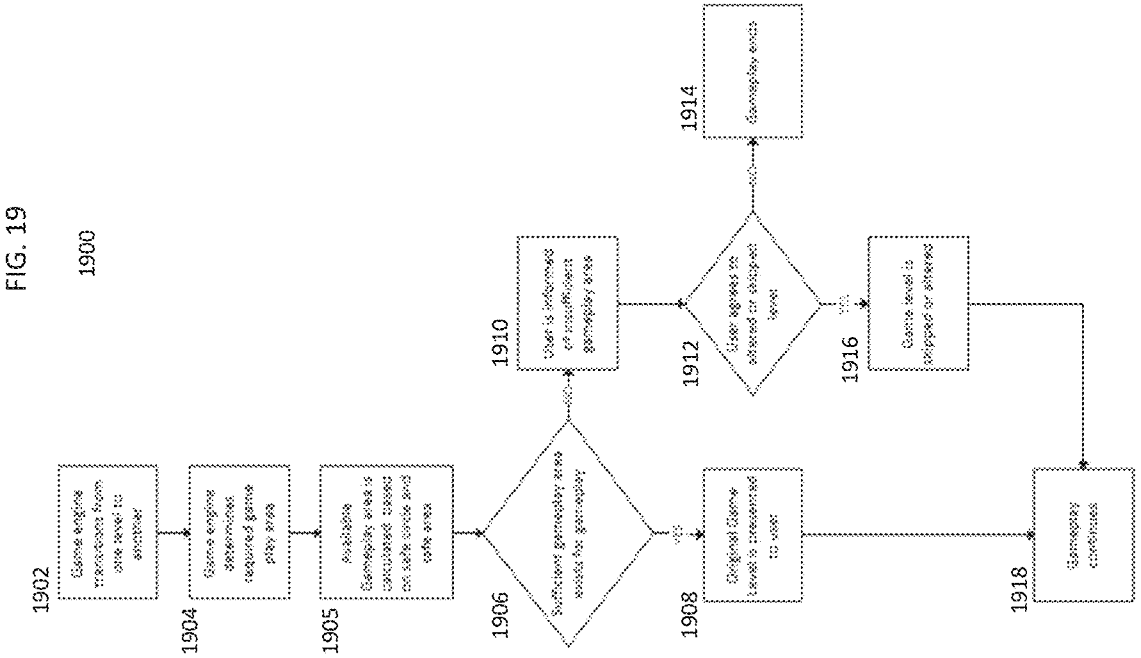
FIG. 19 illustrates an example of a method performed by the system for responding to a new XR game level, according to an aspect of the disclosure.

FIG. 19 illustrates a process 1900 for suggesting XR applications after an XR session has commenced. At 1902, the system determines that a transition has occurred from one level of an XR game to another. For example, the new game level may be a more challenging one than the previous level, or may be one that typically requires more movement, or more physical playing space. Or, the system may determine that a new application has been selected by the XR device.

At 1904, the game engine determines a likely required XR game play area, as discussed above. At 1905, the available play space defined by the user within the physical space is identified, and the personal safe area of the XR device is determined. If sufficient game play area is determined, then at 1908 the selected new game level is presented or is loaded by the game application running in the XR device, and XR activity continues uninterrupted at 1918.

On the other hand, if at 1906, the assistant determines whether a sufficient game play area exists given the size of the safe area and in view of the other XR devices active in the larger play space. If the system determines that there is insufficient space, then the user is informed of insufficient gameplay area at 1910.

At 1912, the user may decide to alter the game by having the system adjust the XR game to reduce the necessary space for playing, as discussed above. Or the user may decide to skip the new level and continue with the previous level or with the previous game. If the user decides against these workarounds, then at 1914 gameplay ends. However, if the user agrees to have the system modify or adjust gameplay, or decides to continue with the previous level the previous game, then gameplay continues at 1918.

The methods or processes 900, 1000, 1100, 1200, 1300, 1800, and 1900 may be implemented, in whole or in part, by the system(s) described herein and shown in the FIGs (e.g., via the XR devices 111*a,b*). One or more actions of the depicted processes may be incorporated into or combined with one or more actions of any other process or embodiments described herein. The processes may be saved to a memory or storage (such as any one or more of those shown in FIG. 3 or 4) as one or more instructions or routines that may be executed by a corresponding device or system to implement the process 300. Depending on the embodiment, one or more steps of the described process may be implemented or facilitated by a server (e.g., a server in communication with one of the XR devices 111*a,b*). While some of the description corresponding to the processes 900, 1000, 1100, 1200, 1300, 1800, and 1900 references a XR device or devices, it will be appreciated that the described steps may be implemented with respect to any suitable XR device in some embodiments.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It should also be noted that the systems and/or methods described above may be applied to, or used in accordance with, other systems and/or methods. In various embodiments, additional elements may be included, some elements may be removed, and/or elements may be arranged differently from what is shown. Alterations, modifications and variations can be affected to the particular embodiments by those of skill in the art without departing from the scope of the present application, which is defined solely by the claims appended hereto.

What is claimed is:

1. A method comprising:

determining a size of a first extended reality (XR) safe area for a first XR device based at least in part on an arm size of a user of the first XR device;

based at least in part on detecting movement of the first XR device, moving the first XR safe area with the first XR device; and based at least in part on detecting a proximity of the first XR safe area to a second XR safe area of a second XR device, transmitting to the first XR device a notification indicating the proximity.

2. The method of claim 1, wherein the first XR device is a head mounted device, and wherein the first XR safe area has a circular shape with radii centered at the first XR device and parallel to a floor.

3. The method of claim 1, wherein the first XR safe area and the second XR safe area are located in a common demarcated play area of a virtual reality session, and further comprising:

based at least in part on detecting the movement of the first XR device, repositioning the first XR safe area so that the first XR safe area has radii centered at the first XR device and parallel to a floor; and notifying the first XR device when the first XR safe area intersects a boundary of the common demarcated play area.

4. The method of claim 1, further comprising:

based at least in part on detecting the movement of the first XR device in a virtual reality session, repositioning the first XR safe area such that the first XR safe area has radii centered at the first XR device and parallel to a floor;

wherein the detecting of the proximity of the first XR safe area to the second XR safe area comprises determining that that the first XR device has recently moved toward the second XR device; and based at least in part on the detecting of the proximity of the first XR safe area to the second XR safe area, transmitting to the second XR device a second notification indicating the proximity.

5. The method of claim 4, wherein the second notification appears different on the second XR device than the notification on the first XR device.

6. A system comprising:

processing circuitry configured:

to determine a size of a first extended reality (XR) safe area of a first XR device based at least in part on an arm size of a user of the first XR device; and based at least in part on detecting movement of the first XR device, moving the first XR safe area with the first XR device; and communication circuitry configured:

to transmit to the first XR device, based at least in part on detecting a proximity of the first XR safe area to a second XR safe area of a second XR device, a notification indicating the proximity.

7. The system of claim 6, wherein the first XR device is a head mounted device, and wherein the first XR safe area has a circular shape with radii centered at the first XR device and parallel to a floor.

8. The system of claim 6, wherein the first XR safe area and the second XR safe area are located in a common demarcated play area of a virtual reality session, and wherein the processing circuitry is further configured:

to reposition, based at least in part on detecting the movement of the first XR device, the first XR safe area so that the first XR safe area has radii centered at the first XR device and parallel to a floor; and to notify the first XR device when the first XR safe area intersects a boundary of the common demarcated play area.

9. The system of claim 6, wherein the processing circuitry is further configured:

to reposition, based at least in part on detecting the movement of the first XR device in a virtual reality session, the first XR safe area such that the first XR safe area has radii centered at the first XR device and parallel to a floor;

wherein the detecting of the proximity of the first XR safe area to the second XR safe area comprises determining that that the first XR device has recently moved toward the second XR device; and to transmit, based at least in part on the detecting of the proximity of the first XR safe area to the second XR safe area, to the second XR device a second notification indicating the proximity.

10. The system of claim 9, wherein the second notification appears different on the second XR device than the notification on the first XR device.

11. The system of claim 6, wherein the determining the size of the first XR safe area comprises determining a distance from a first distal extent of a first extended arm of the user of the first XR device to a second distal extent of a second extended arm of the user of the first XR device.

12. The system of claim 6, wherein the determining the size of the first XR safe area comprises determining a distance from a first position of a first hand-held XR device held by the user of the first XR device to a second position of a second hand-held XR device held by the user of the first XR device.

13. The system of claim 6, wherein the first XR device is a head mounted device worn on a head of the user of the first XR device, wherein the determining the size of the first XR safe area comprises determining a distance from the head mounted device to a first position of a hand-held XR device held by the user of the first XR device.

14. The method of claim 1, wherein the determining the size of the first XR safe area comprises determining a distance from a first distal extent of a first extended arm of the user of the first XR device to a second distal extent of a second extended arm of the user of the first XR device.

15. The method of claim 1, wherein the determining the size of the first XR safe area comprises determining a distance from a first position of a first hand-held XR device held by the user of the first XR device to a second position of a second hand-held XR device held by the user of the first XR device.

16. The method of claim 1, wherein the first XR device is a head mounted device worn on a head of the user of the first XR device, wherein the determining the size of the first XR safe area comprises determining a distance from the head mounted device to a first position of a hand-held XR device held by the user of the first XR device.

* * * * *